(12) United States Patent
Cardno et al.

(10) Patent No.: US 9,305,180 B2
(45) Date of Patent: Apr. 5, 2016

(54) DATA OBFUSCATION SYSTEM, METHOD, AND COMPUTER IMPLEMENTATION OF DATA OBFUSCATION FOR SECRET DATABASES

(75) Inventors: Andrew John Cardno, San Diego, CA (US); Ashok Kumar Singh, Henderson, NV (US)

(73) Assignee: New BIS Luxco S.à r.l, Luxembourg (LU)

( * ) Notice: Subject to any disclaimer, the term of this patent is extended or adjusted under 35 U.S.C. 154(b) by 722 days.

(21) Appl. No.: 12/992,513

(22) PCT Filed: May 12, 2009

(86) PCT No.: PCT/NZ2009/000077
§ 371 (c)(1),
(2), (4) Date: Mar. 30, 2011

(87) PCT Pub. No.: WO2009/139650
PCT Pub. Date: Nov. 19, 2009

(65) Prior Publication Data
US 2011/0179011 A1    Jul. 21, 2011

Related U.S. Application Data

(60) Provisional application No. 61/052,613, filed on May 12, 2008.

(51) Int. Cl.
G06F 7/00 (2006.01)
G06F 17/30 (2006.01)
G06F 21/62 (2013.01)

(52) U.S. Cl.
CPC ...... *G06F 21/6254* (2013.01); *G06F 17/30943* (2013.01); *G06F 21/6227* (2013.01)

(58) Field of Classification Search
USPC .................... 707/758, 769, 999.003
See application file for complete search history.

(56) References Cited

U.S. PATENT DOCUMENTS

| | | | | |
|---|---|---|---|---|
| 4,754,410 A | * | 6/1988 | Leech | G05B 13/028 700/31 |
| 5,454,101 A | * | 9/1995 | Mackay et al. | |
| 5,535,128 A | * | 7/1996 | Laube et al. | 700/119 |
| 5,963,642 A | * | 10/1999 | Goldstein | 713/193 |

(Continued)

FOREIGN PATENT DOCUMENTS

| | | | |
|---|---|---|---|
| GB | 2 444 338 | | 6/2008 |
| GB | 2444338 A | * | 6/2008 |
| WO | WO 2008/039565 A2 | | 4/2008 |

OTHER PUBLICATIONS

Burridge et al., "A methodological Framework for Statistical Disclosure Limitation of Business Microdata"; Computational Aspects of Statistical Confidentiality, 2002, pp. 1-23.*

(Continued)

*Primary Examiner* — Daniel Kuddus
(74) *Attorney, Agent, or Firm* — Merchant & Gould P.C.

(57) ABSTRACT

A data obfuscation system, method, and computer implementation via software or hardware allows a legitimate user to gain access via a query to data of sufficient granularity to be useful while maintaining the confidentiality of sensitive information about individual records. Output values of a data request are obfuscated in a repeatable manner, via the use of an Obfuscating Function (OF), while maintaining the amount of obfuscation within a range so that the transformed values provide to a user information of a prescribed level of granularity. The data obfuscating system and method is particularly applicable to databases. The data obfuscation engine may be implemented in hardware and/or software within a stand alone or distributed environment.

28 Claims, 11 Drawing Sheets

(56) References Cited

U.S. PATENT DOCUMENTS

| | | | | |
|---|---|---|---|---|
| 5,966,537 | A * | 10/1999 | Ravichandran | 717/158 |
| 6,297,095 | B1 * | 10/2001 | Muralidhar et al. | 438/257 |
| 6,374,402 | B1 * | 4/2002 | Schmeidler et al. | 717/167 |
| 6,643,686 | B1 * | 11/2003 | Hall | 709/206 |
| 6,643,775 | B1 * | 11/2003 | Granger | G06F 21/123 380/255 |
| 6,668,325 | B1 * | 12/2003 | Collberg et al. | 713/194 |
| 7,080,257 | B1 * | 7/2006 | Jakubowski et al. | 713/187 |
| 7,200,757 | B1 * | 4/2007 | Muralidhar et al. | 713/189 |
| 7,596,277 | B2 * | 9/2009 | Govindaswamy et al. | 382/232 |
| 7,672,967 | B2 * | 3/2010 | Fay | 707/999.102 |
| 7,743,069 | B2 * | 6/2010 | Chitkara et al. | 707/781 |
| 7,920,702 | B2 * | 4/2011 | Shen-Orr | G06F 21/10 380/202 |
| 7,975,308 | B1 * | 7/2011 | Satish | G06F 17/30867 713/152 |
| 8,094,813 | B2 * | 1/2012 | Ciet et al. | H04L 9/00 380/28 |
| 8,140,809 | B2 * | 3/2012 | Farrugia | G06F 21/14 711/170 |
| 2003/0093384 | A1 * | 5/2003 | Durst, Jr. et al. | 705/64 |
| 2003/0188187 | A1 * | 10/2003 | Uchida | G06F 21/125 726/26 |
| 2003/0236986 | A1 * | 12/2003 | Cronce et al. | 713/189 |
| 2004/0236955 | A1 * | 11/2004 | Chow | G06F 21/14 713/190 |
| 2008/0181396 | A1 * | 7/2008 | Balakrishnan | G06F 17/2276 380/28 |
| 2008/0275829 | A1 * | 11/2008 | Stull | H04L 9/00 706/17 |
| 2009/0119515 | A1 * | 5/2009 | Nicolson et al. | 713/190 |
| 2009/0132419 | A1 * | 5/2009 | Grammer et al. | 705/50 |
| 2009/0132823 | A1 * | 5/2009 | Grimen et al. | 713/171 |
| 2009/0180346 | A1 * | 7/2009 | Choi et al. | 365/226 |
| 2009/0307657 | A1 * | 12/2009 | Farrugia et al. | 717/110 |
| 2012/0311339 | A1 * | 12/2012 | Irvine | H04L 63/0407 713/176 |

OTHER PUBLICATIONS

Cox, Lawrence H. "Suppression Methodology and Statistical Disclosure Control." *Journal of the American Statistical Association*, vol. 75, No. 370, Jun. 1980, pp. 377-385.

Cox, Lawrence H. "A Constructive Procedure for Unbiased Controlled Rounding," *Journal of the American Statistical Association*, vol. 82, No. 398, Jun. 1987, pp. 520-524.

Cox et al. "Controlled Rounding." *INFOR 20*. 1982. pp. 423-432.

Chowdhury et al "Disclosure Detection in Multivariate Categorical Databases: Confidentiality Protection Through Two New Matrix Operators" *Management Science 45*. 1999. pp. 1710-1723.

Devroye "Non-Uniform Random Variate Generation," 1986. New York-York: Springer-Verlag http://www.nrbook.com/devroye/.

Duncan et al. "Disclosure-Limited Data Dissemination," *Journal of the American Statistical Association*. vol. 81. No. 393, Mar. 1986, pp. 10-18.

Duncan et al. "Optimal Disclosure-Limited Strategy in Statistical Databases: Deterring Tracker Attacks Through Additive Noise," *Journal of the American Statistical Association*, vol. 95, No. 451, Sep. 2000, pp. 720-729.

Franconi et al. "A Model-Based Method for Disclosure Limitation of Business Microdata," *The Statistician*. Vo. 51, No. 1, 2002, pp. 51-61.

Gonzalez, Jr et al. "Software for Tabular Data Protection," *Statistics in Medicine*, vol. 24, 2005, pp. 659-669.

Hörmann et al. "Rejection-Inversion to Generate Variates from Monotone Discrete Distributions," *ACM Transactions on Modeling and Computer Simulation*, vol. 6, No. 3, Jul. 1996, pp. 169-184.

Johnson, R. A. et al. *Applied Multivariate Statistical Analysis*, 6th Edition. Prentice Hall, New Jersey, 2007.

Kelly et al. "Controlled Rounding of Tabular Data," *Operations Research*, vol. 38, No. 5, Sep.-Oct. 1990, pp. 760-772.

Kutner et al *Applied Linear Regression Models*, 4th Edition, McGraw-Hill/Irwin, 2006.

Muralidhar et al. "General Additive Data Perturbation Method for Database Security" Management Science. vol. 45, No. 10, Oct. 1999, pp. 1399-1415.

Nargundkar et al. "Random Rounding to Prevent Statistical Disclosures," *Proceedings of the Social Statistics Section*, American Statistical Association, 1972, pp. 382-385.

Salazar-Gonzalez et al. "A New Tool for Applying Controlled Rounding to a Statistical Table in Microsoft Excel," *Lecture Notes in Computer Science*, vol. 3050, Springer-Verlag, 2004, 44-57.

* cited by examiner $Y = X_{TRUE} + e * X_{TRUE}$
$e \sim N(0, \sigma^2)$

Histogram of values in the synthetic database with 49 equal class intervals, for Example 4

Histogram of values in the synthetic database with 1000 equal class interval, for Example 4

Histogram of values in database based upon k = 49 unequal class intervals, for Example 4 (NOTE: x-axis is not to scale.)

Graph of perturbed mid-points (Y) vs. true mid-points (M) of class intervals, for Example 4

Histogram of values in the synthetic database with 62 equal class intervals, for Example 5

Histogram of values in the synthetic database with 1000 equal class intervals, for Example 5

Histogram of values in the synthetic database with 67 unequal class interval, for Example 5
NOTE: x-axis is not to scale.

DATA OBFUSCATION SYSTEM, METHOD, AND COMPUTER IMPLEMENTATION OF DATA OBFUSCATION FOR SECRET DATABASES

This application is a National Stage Application of PCT/NZ2009/000077, filed 12 May 2009, which claims benefit of U.S. Ser. No. 61/052,613, filed 12 May 2008 and which applications are incorporated herein by reference. To the extent appropriate, a claim of priority is made to each of the above disclosed applications.

FIELD OF THE INVENTION

A data obfuscation system, method, and computer implementation via software or hardware, are provided that allows a legitimate user to gain access via a query to data of sufficient granularity to be useful while maintaining the confidentiality of sensitive information about individual records. The data obfuscating system and method is particularly applicable to databases.

BACKGROUND OF THE INVENTION

The problem of securing organizational databases so that legitimate users can access data needed for decision making, while limiting disclosure so that confidential or sensitive information about a single record cannot be inferred, has received considerable attention in the statistical literature.

Data are numbers, characters, images or other outputs from devices that convert physical quantities into symbols. Data can be stored on media, as in databases, numbers can be converted into graphs and charts, which again can be stored on media or printed. Most of the decision making, in business or other disciplines, requires useful data. A database that contains sensitive or confidential information stores data and therefore it is secured—by encryption using a public key, by encryption using a changing public key, in which case the data is held secure while the public key is changed, or by restricting access to it by the operating system.

A database (DB) application must protect the confidentiality of sensitive data and also must provide reasonably accurate aggregates that can be used for decision making. One approach to achieve this goal is to use a statistical database system (SDB). An SDB allows users to access aggregates for subsets of records; the database administrator (DBA) sets a minimum threshold rule on the size of the subset for which aggregates can be accessed. As an example, in an SDB, if a query returns less than or equal to 89 records, then no information is provided to the user for such a query.

A database that obfuscates data is conventionally known as a secret database. A secret database is ideally efficient (stores the data in an efficient manner with minimal overhead), provides a query language (e.g., SQL) interface, is repeatable, i.e., it returns identical results for identical queries, and protects the confidentiality of individual records.

A secret database may be implemented in a parallel fashion as in a parallel set of query pre and post filters. These may be implemented as distributed hardware components given this ability for the obfuscation to be built to handle very large databases and run the queries against the database in a distributed way.

There are a number of known techniques to obfuscate data. In controlled rounding, the cell entries of a two-way table are rounded in such a way that the rounded arrays are forced to be additive along rows and columns and to the grand total (Cox and Ernst, 1982; Cox, 1987). In random rounding, cell values are rounded up or down in a random fashion; the rows (or columns) may not add up to the corresponding marginal totals. Salazar-Gonzales and Schoch (2004) developed a controlled rounding procedure for two-way tables based upon the integer linear programming algorithm. Gonzales and Cox (2005) developed software for protecting tabular data in two dimensions; this software is uses the linear programming algorithm and implements several techniques for protection of tabular data: complementary cell suppression, minimum-distance controlled rounding, unbiased controlled rounding, subtotals constrained controlled rounding, and controlled tabular adjustment.

Cox (1980) considered the problem of statistical disclosure control for aggregates or tabulation cells and discussed cell suppression methodology under which all cells containing sensitive information are suppressed from publication. Duncan and Lambert (1986) used Bayesian predictive posterior distributions for the assessment of disclosure of individual information, given aggregate data. Duncan and Mukherjee (2000) considered combining query restriction and data obfuscating to thwart stacks by data snoopers. Chowdhury et al. (1999) have developed two new matrix operators for confidentiality protection.

Franconi and Stander (2002) proposed methods for obfuscating business microdata based upon the method of multiple linear regression (MLR); their method consists of fitting an MLR equation to one variable based upon the values of the other variables in the database, using all of the records in the database. There are three potential problems with this approach:
(1) the fitted MLR equations may provide poor prediction, which in turn will lead to very poor resolution in the obscured values,
(2) the amount of obfuscation cannot be controlled, and
(3) since databases are typically very large, this method may not be computationally efficient.

Muralidhar et al. (1999) developed a method for obfuscating multivariate data by adding a random noise to value data; their method preserves the relationships among the variables, and the user is given access to perturbed data. One potential problem with this approach is that a query may not be repeatable, i.e., identical queries may produce random outputs, in which case one can get very close to the true values by running identical queries a large number of times.

Thus, it is desirable to provide a system and method for obfuscating data so that a data request or query is repeatable, and access is allowed to users of the data while limiting the disclosure of confidential information on an individual has increased.

Exemplary Embodiments

There is disclosed a method of obfuscation in which a standard data query may be submitted to a secret database with output data being obfuscated.

According to one exemplary embodiment there is disclosed a method of obfuscating data so that output values of a data request are obfuscated in a repeatable manner, via the use of an Obfuscating Function (OF) whilst maintaining the amount of obfuscation within a range so that the transformed values provide to a user information of a prescribed level of granularity.

There is further disclosed a method of obfuscating data comprising:
running an unconstrained query on data in a secret database to produce output data; and obfuscating the output data using a repeatable obfuscation function to return obfuscated data in response to the query.

There is also disclosed an obfuscation system comprising:
an input interface;
a query engine for receiving input data from the input interface; memory interfaced to the query engine for storing data and supplying data to the query engine in response to a data request;
an output interface configured to receive output data from the query engine; and
an obfuscation engine for obfuscating data retrieved from memory and obfuscating it in a repeatable manner prior to supplying it to the output interface.

There is further disclosed software for implementing the methods, data produced by the methods, storage media embodying the data produced by the method, hardware for implementing the methods and printed media embodying data produced by the methods.

There is further disclosed an obfuscation system comprising a database, an obfuscation circuit and a user interface wherein the obfuscation circuit operates according to the method and an obfuscation circuit adapted to interface between a database and a user interface which obfuscates data values returned from a database in response to a user query operating in accordance with the method.

There is also disclosed a method of representing data having a first level of granularity at a second level of granularity, coarser than the first level of granularity, wherein the data is converted from the first level of granularity to the second level of granularity according to a rule other than the simple proximity of the data to the nearest value at the second level of granularity.

There is also disclosed a method of distributing the processing of the obfuscation such that it is distributed across multiple hardware or virtual hardware or circuit components. These components enable the obfuscation to be executed on very large databases or very large volumes of queries may be processed.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention.

DETAILED DESCRIPTION OF EMBODIMENTS OF THE INVENTION

The system and method for obfuscating data described is particularly applicable to a database and a query language, and more particularly to a structured query language (SQL) database and it is in this context that the system and method for obfuscating data will be described. It will be appreciated, however, that the system and method for obfuscating data has greater utility since it can be used to obscure any type of data however that data may be stored or generated.

Figure 1:
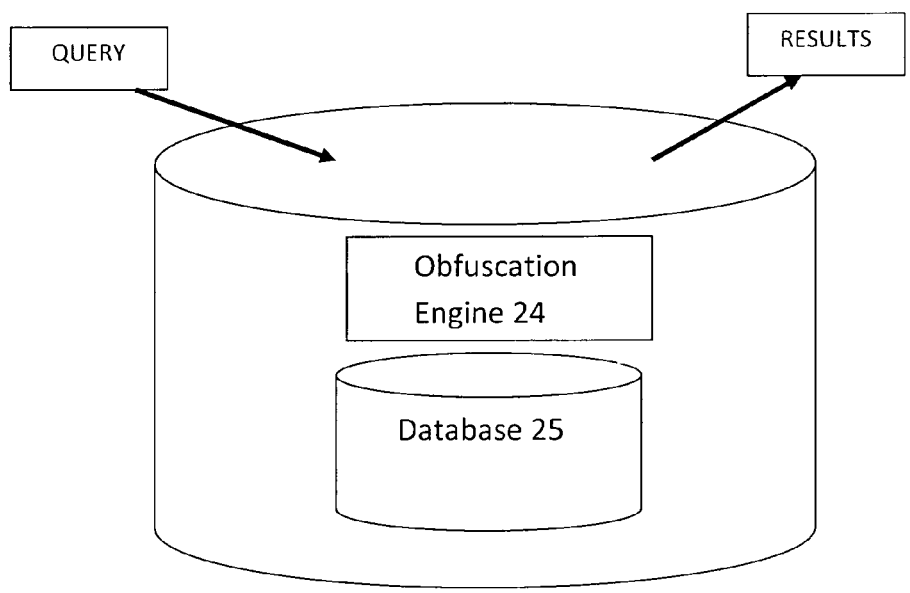
FIG. 1 shows a system for obfuscating data.

FIG. 1 illustrates a system for obfuscating data wherein the obscured data may be stored in a secret database, such as a well known structured query language (SQL) database. The system may include an obfuscating unit/function that obscures the underlying data 25 in the database. Thus, when a query is made to the database, such as an SQL query as shown, the database can return results that allow a legitimate user to gain access to data of quality sufficient for making business decisions while maintaining the confidentiality of sensitive information about individual records. The obfuscation engine 24 may be implemented as one or more lines of computer code (that may or may not be part of a database management system software) that implement the different processes for obfuscating the data as described below in each of the embodiments. However, the obfuscating unit/function also may be implemented as a hardware device/circuit or as a combination of hardware and software and the system and method is not limited to any particular implementation of the obfuscating unit/function.

Figure 19:
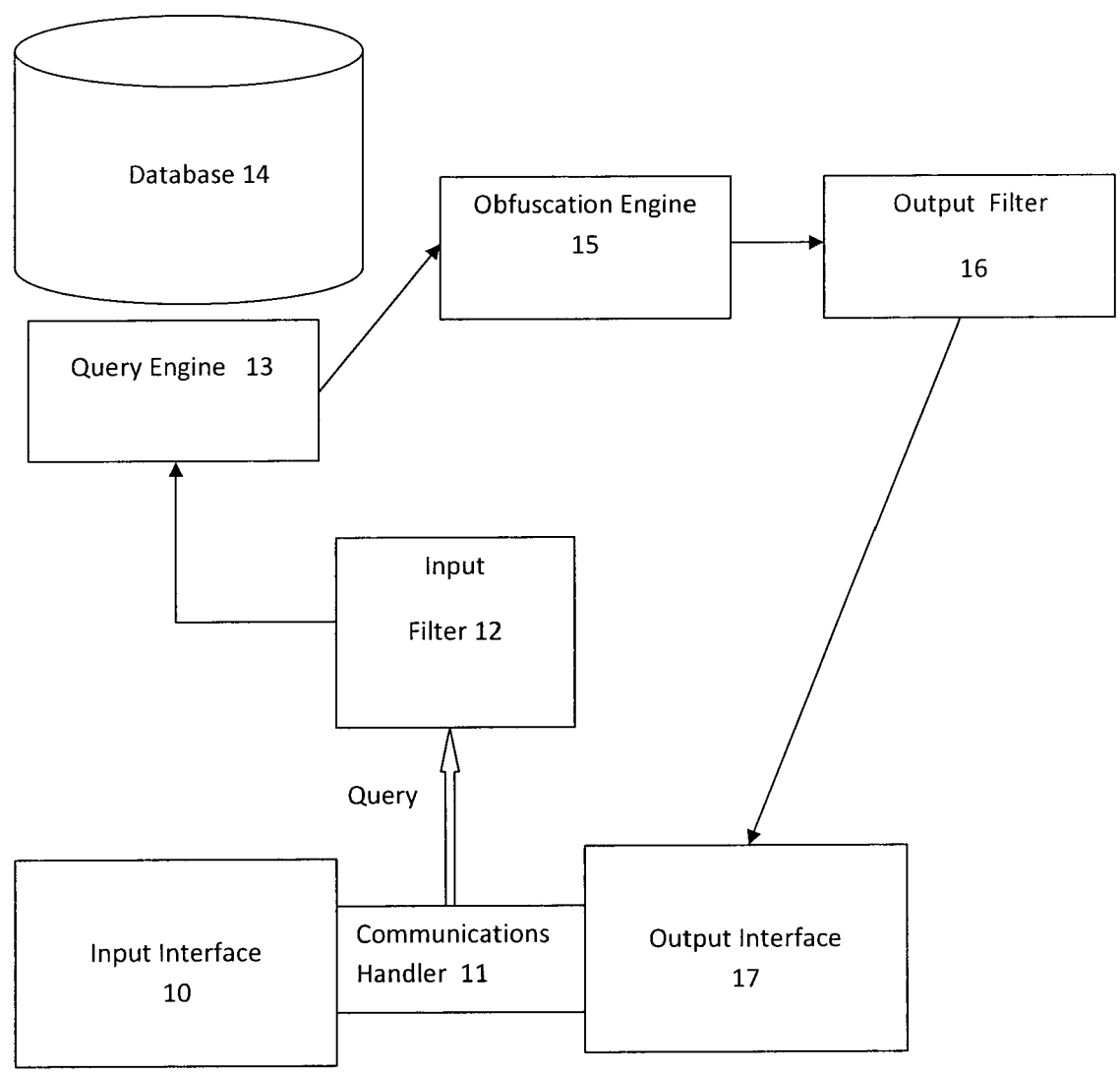
FIG. 19 shows a system for implementing an obfuscation method.

The software or hardware implementation of the system and method of obfuscation of this invention can be implemented in a desktop environment, or a computer cluster. FIG. 19 shows a computer system in which a query is received by input interface 10 and a communications handler 11 passes the query to an input filter 12 to ensure that the query is of a permitted type. The input filter 12 may ensure that the granularity of the query matches the granularity of the obfuscation; in general it is necessary to ensure that the boundary conditions on the filters are correct for obfuscation, for example on random rounding the boundaries of filters may be random rounded before the query is processed or on statistical adjustment the input boundaries may be statistically adjusted before the query is executed. This pre-process may be used to limit the final aggregation of the data. In addition this filter may be used to stop repeated queries that may be persistent access attempts to flood the obfuscation method. The query is then executed by query engine 13. Query engine 13 may apply filters on the queries, for example filtering our queries that restrict to very fine ranges or queries that have a very limited subset of data. This filtering may be applied by the individual selection criteria clause or to the whole of the query. Filtering includes methods such as applying joins or other functional criteria, which then retrieve data for the query from database 14. The output data from query engine 13 is then obfuscated by an obfuscation engine 15.

The output of obfuscation engine 15 passes through output filter 16. The output filter 16 may apply a restriction to the output values using a linear function or a measured threshold value. The output filter may count the number of the frequency of the base data being filtered—for example a simple linear filter filtering records which are constructed of less than X records or a filter based on the variation in the data such that the results must be within certain statistical measures of each other, for example the base data can not vary by more than one standard deviation of the mean. Output filter 16 may also perform additional post query filtering such as distributing results based on filtering (e.g. distributing email, storing output data to different storage media etc.), additional filtering (i.e. only delivering results satisfying a data field criteria) etc. Output filter 16 may include a programmable streaming data processor. The output from output filter 16 may be output by output interface 17 for use by a user or other device.

It will be appreciated that components of the system may be implemented in hardware or software. Each of these processes may be run either singularly or in parallel. When the processes are run in parallel the results of the parallel process may be the same or similar independent of which process executed the request. However, it may be advantageous for the obfuscation engine to be implemented as a specific circuit to ensure obfuscation of all output data. Although the obfuscation engine is shown as a single engine it will be appreciated that data obfuscation may be performed by multiple nodes of a clustered computer system. The data may be abstract data and/or data obtained from real world sensors etc. The output data may drive a display, printer, or some real world device (e.g. where a sensitive location cannot be revealed but a vehicle or person or other kind of moveable vessel needs to be inhibited from travelling within a certain range of a sensitive location). In another kind of obfuscation relating to tracking of moveable objects the results of this tracking may be presented in aggregate such that obfuscation can be applied to enable output of information such as the number of vehicles or people or vessels in area without the recipients of said information being able to determine the specific time and or place an event or movement occurred.

Systems and methods of data obfuscation described herein are based upon tools used in mathematical modeling, and include:

1) Obfuscation based on weighted regression, in which (a) the dependent variable is a perturbed version of the true value, and the independent variable is the true value itself, (b) the dependent variable is a the true value and the independent variables are functions of the true value and values of other value columns in the database.
2) Obfuscation based upon a Taylor Series Expansion of a function of values in the database.
3) Obfuscation in which data having a first level of granularity is shown to the user at a second level of granularity, coarser than the first level of granularity, wherein the data is converted from the first level of granularity to the second level of granularity according to a rule other than the simple proximity of the data to the nearest value at the second level of granularity.
4) A method of obfuscating data including random rounding, especially a mapping based method based on the last digit. As an example, if the last digit is x, then it gets mapped to 9−x, where x=0, 1, 2, . . . , 8, 9. This method loses information but retains the consistency of the data. Another example is to map all odd frequencies to round down and even frequencies to round up.
5) A method of obfuscating data that is based upon a (Pseudo) random number seeding function which will seed random number generator with input value(s), with output either shifted up or down a number of granularity factors. The seeding function could be taken from some external measure, such as the last digit of the temperature or the time at any point, if repeatability is required it can be held secret and entered by human.

Several different embodiments of the system and methods for obfuscating data are described to illustrate the system and method for obfuscating data. For example, the data may be obscured based upon random rounding and least squares regression involving one or more predictor variables. As another example, the data may be obscured based upon random rounding of frequency data and simple linear regression of value data. As yet another example, the data may be obscured using principal components regression (PCR) wherein the data may be multivariate data.

Using weighted regression each point may be given equal weight, a weighting inversely proportional to its value or a weighting inversely proportional to the mid-point of the class interval and directly proportional to the frequency of the class interval. The Obfuscation Function (OF) may minimize Total Weighted Error. The Total Weighted Error may be the Sum of Squared Errors, the Sum of Absolute Errors, the Sum of Squared Relative Errors or the Sum of Absolute Relative Errors. The method may be matrix algebra based, based upon computer search or based upon neural networks. Random errors may be added to true values to form a dependent variable y for weighted regression, using the true data value as the independent variable.

Weighted regression may also be based upon using the true data value as the dependent variable, some function of the true data value as the independent variable, and fitting a regression equation. Alternatively, weighted regression may also be based upon using the true data value as the dependent variable, some function of the true data value and values in other columns as the set of independent variables, and fitting a regression equation.

Weighted regression may be applied to a subset of records obtain an obfuscating function. Weighted regression may include selecting a subset of records which is a k-point summary of values, on which weighted regression is performed to get an obfuscating function.

Obfuscation may be implemented in one of many ways as follows:

1. Each value column in the database can be obfuscated, and then the obfuscated values can be stored in another database; a user may be given access to this obfuscated database. Alternatively, value data can be obfuscated in response to a data request or a query from a user.
2. When the information requested by a user is in the form of a graph or chart, visual display is provided using obfuscated data. The obfuscated data may be used in data visualization systems including geographical information systems and classical graphing systems.
3. The calculations for the obfuscation method can be made within a desktop environment, or on a computer cluster. In the case of a distributed database, which is a database that resides on storage devices that are not all attached to a common CPU but to multiple computers, which may or may not be located in the same physical location, calculations for data obfuscation can be performed in various nodes of a clustered computer.
4. The calculation of frequency in a computer program can be performed using integer type, in which the integer type may be stored in 2, 4, 8, 16, 32, 62, 128, 256, 512 or 1024 bytes in memory.
5. Data can be obfuscated as anticipated, and then pre-calculated; the obfuscated values can be stored for user access.
6. When a data request consists of multiple logical components, restrictions may be applied on these separately. A query, for example an SQL query, may often restrict the data, typically by using the WHERE clause of the SQL statement. These statements look like "where X<10" OR "where X>1000". In this case if the database had only one person with X>1000 then the result set would contain several small values which could be filtered.
7. A request for an aggregate can be handled in two ways: (a) the methods of obfuscation can be applied on value data for which the aggregate is requested, and then the aggregate is computed from the obfuscated data, and (b) the aggregate is first computed based on the true values in the database, and then the aggregate is obfuscated before returning an output to the user.
8. Restrictions can be applied to the data relating to the granularity of the frequency data. If the granularity of the result set is 90 records, then it might be necessary to only allow filters in multiples of 90, in other words 90, 180, 270, 360, 450 . . . .
9. The obfuscation amount could be altered in response to a number of factors including security level or frequency of query or granularity of the output data. For example if a query sums all data in the database it will not need obfuscation. This would also be an efficiency application. This would need to be applied to each sub clause in the "Where" statement.
10. The amount of obfuscation can be made to depend upon (a) different use access rights, (b) different levels of frequency of output aggregation. As an example, the output in response to a user with low access rights may have a larger amount of obfuscation than that for a user with high access rights. An example, the output in response to a query with frequency of 110 may have a larger amount of obfuscation than a query with frequency of 505.
11. The obfuscated values may be used in the calculation of an index to the obfuscated data. An index on a database, such as a hash or B-Tree index are pre calculated lookups so queries are faster. The implementation would need to build indexes on the obfuscated values.
12. The original data can be stored in a secured format, for example, in an encrypted database, where the access to the data is restricted by the operating system. The encryption can be done using a public key encryption method, which may be changed in a secure manner. The encryption can be applied to the output data as well.
13. The system and method of this invention produces obfuscated data. The output data can be used for further calculations in many ways and for many purposes: to compute statistical summary of database, to perform some heuristic calculations on values in the database, to prepare graphs in a graphic software package or a geographic information system. The obfuscated data can of course be printed, or stored on any media for further computations, or even encrypted.
14. When data is transmitted between nodes of a clustered computer, there may be errors in the transmission. This transmission can be at any level of the solution stack. These error checks monitor for transmission errors. This is of particular value in the between node communications in a cluster. The integrity check value is implemented with a technology selected from the group consisting of: CRC (cyclic redundancy check), hash, MD5, SHA-1, SHA-2, HMAC (keyed-hash message authentication code), partial-hash-value and parity checks. If the solution is implemented as a middleware layer the communications between the database cluster and the middleware are integrity checked.

In one embodiment, the obfuscating unit/function may use a least squares regression for obfuscating the base data and random rounding is then applied to output from regression to further reduce resolution. In broad terms, this embodiment uses a method of least squares regression in a computationally efficient way that allows the user to control the amount of obfuscating while maintaining repeatability of a query. The obfuscating unit in this embodiment provides a database application (DBA) such as a database management application with the flexibility of obfuscating data with or without adding a random noise to the values in the database, is easier to implement as it is based on regression which may be applied to all N records in the database in case N is moderate and to a subset of records in the database in case N is extremely large, and will yield identical outputs to identical queries, even if the value data is perturbed by adding a random noise.

In this embodiment, the obfuscating of value data is done by performing weighted regression. Weights for data points used in regression can be chosen in any one of two ways:
  (1) Weights proportional to some function of value, and
  (2) Equal weights, in which case the Weighted Least Squares Regression becomes Ordinary Least Square Regression.

In a regression modeling application, a linear model is fitted to a dependent variable Y as a function of predictor variables $X_1, X_2, \ldots, X_p$; where p can equal 1 (in which case obfuscating is done on one column) or p can be greater than 1 (in which case several columns need to be obscured at once). The data needed for regression consists of a set of n records $\{(X_{1,i}, X_{2,i}, \ldots, X_{p,i}, Y_i)\}$, where n is a positive integer, $p<n=N$.

The method of weighted regression for the case of one predictor variable (p=1) is briefly described below:

$$y_i = a + bx_i + e_i$$

$$e_i = y_i - (a + bx_i)$$

The unknown parameters a and b are chosen so as to minimize a measure of departure from the model, which we will refer to as the Total Weighted Error=H(a,b).

Total Weighted Error can be defined in one of several ways:
(1) Weighted Sum of Squared Errors $$H(a,b) = \sum_{i=1}^{n} e_i^2 = \sum_{i=1}^{n} w_i(y_i - a - bx_i)^2$$

(2) Weighted Sum of Absolute Errors $$H(a,b) = \sum_{i=1}^{n} |e_i| = \sum_{i=1}^{n} w_i|y_i - a - bx_i|$$

(3) Weighted Sum of Squared Relative Errors $$H(a, b) = \sum_{i=1}^{n} e_i^2 = \sum_{i=1}^{n} w_i \left( \frac{y_i - a - bx_i}{y_i} \right)^2$$

(4) Weighted Sum of Absolute Relative Errors $$H(a, b) = \sum_{i=1}^{n} |e_i| = \sum_{i=1}^{n} w_i \left| \frac{y_i - a - bx_i}{y_i} \right|$$

Total Weighted Error as defined in (1) or (3) can be minimized by using matrix algebra, whereas the Total Weighted Error as defined in (2) or (4) need to be minimized using a computer search method, or an artificial neural network.

To apply weighted regression, the variable $X_{TRUE,i}$ is used as a predictor or as a dependent variable, depending upon the obfuscating method used, where $X_{TRUE,i}$ is the true value of the data in record i, and the variables $(X_{1,i}, X_{2,i}, \ldots, X_{p,i})$ can be chosen in one of several ways depending upon the following:

(a) p=number of columns of data to be obscured=1

Figure 2A:
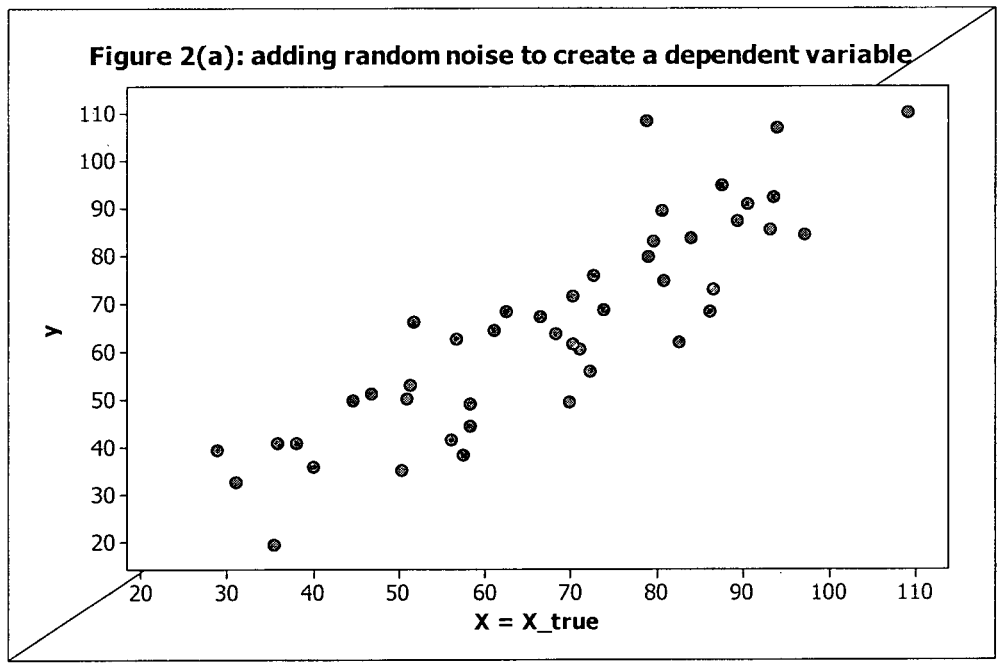
FIG. 2A shows a method for obfuscating data based on addition of random noise to the data values.

The choice for $Y_i$ depends upon whether a random error will be added to perturb the data or not as follows:

1) A method based upon addition of a random noise to the data values $Y_i = X_{TRUE,i} + e_i$ where $e_i$ is random error with mean 0 and variance $\sigma^2$, as shown in FIG. 2a;

or

2) A method based upon not adding any random noise to the data values

Figure 2B:
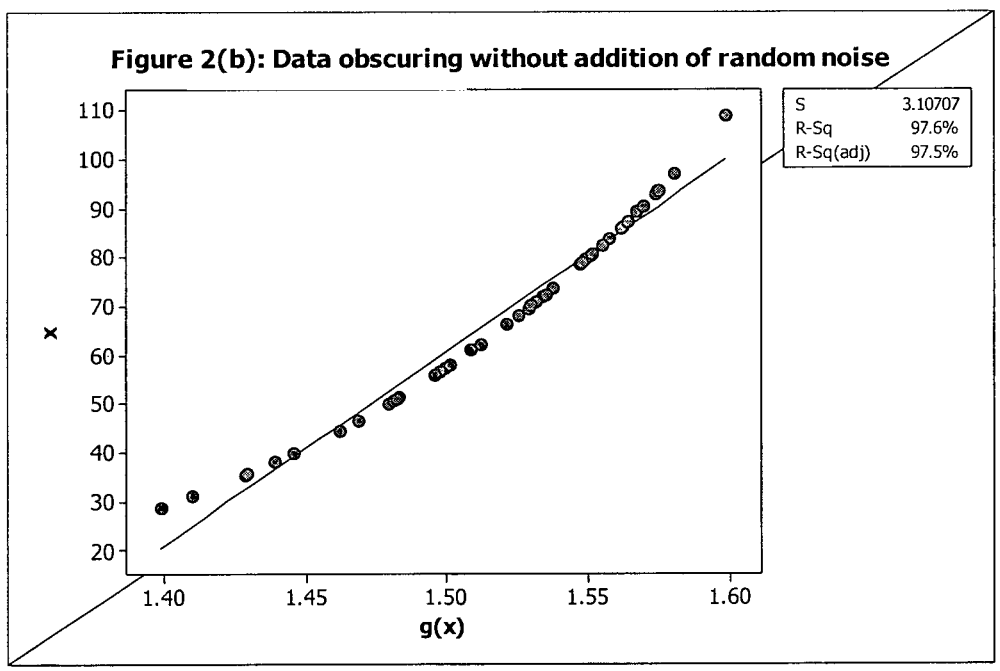
FIG. 2B shows a method for obfuscating data based on not adding any random noise to the data values.
Figure 3:
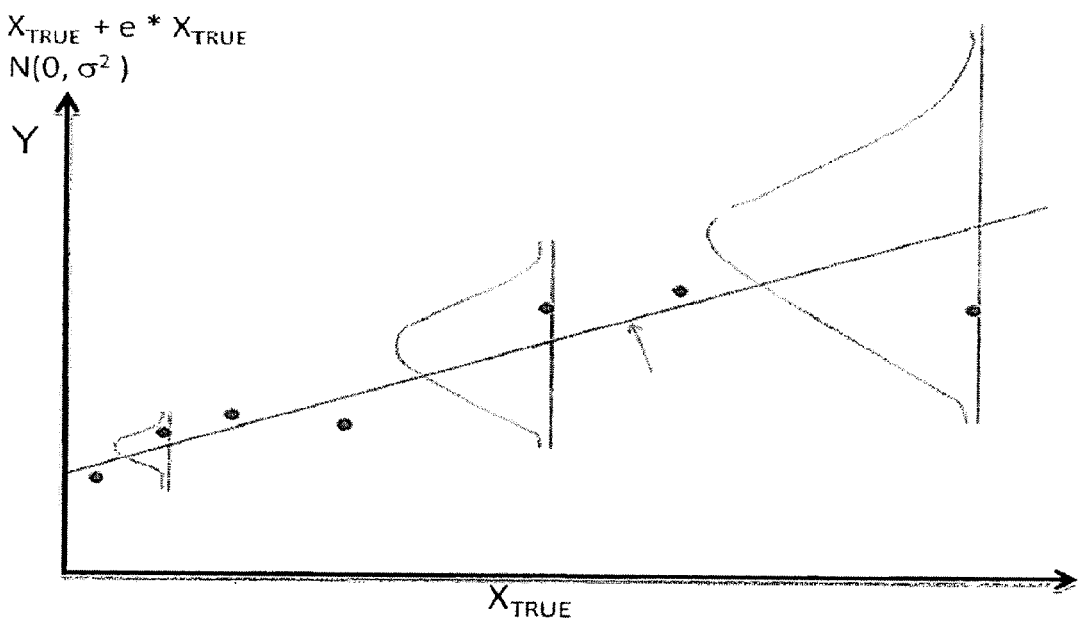
FIG. 3 shows a method for obfuscating data using regression.

Calculate $X_i = g(X_{TRUE,i})$, where g(X) is some non-linear function of X, as shown i FIG. 2b.

Set the dependent variable as $Y_i = X_{TRUE,i}$ and the predictor as $X_i = g(X_{TRUE,i})$ and fit the straight line $Y_i = a + bX_i + e_i$ to the $(X_i, Y_i)$ data.

This fitted line is used as the output of an SQL query.

(b) p=number of columns of data to be obscured>1

This case can be handled in one of two ways:

(i) Using the univariate method for case p=1 (given above) on each of the m columns of data to be obscured, or (ii) Using the method of least squares to fit a multiple regression model $Y_i = \beta_0 + \beta_1 X_{1,i} + \ldots + \beta_p X_{m,i} + e_i$ to the data $\{(X_{1,i}, X_{2,i}, \ldots, X_{m,i}, Y_i)\}, i=1, 2, \ldots, n\}$ where m<p and the m predictors $X_{1,i}, X_{2,i} \ldots, X_{m,i}$, are derived from the true values, $X_{1true,i}, X_{2true,i}, \ldots, X_{ptrue,i}$.

As an example, the m predictors can be taken as the first m principal component scores (Johnson and Wichern, 2007) obtained from performing a principal components analysis (PCA) of the subset $\{(X_{1,i}, X_{2,i}, \ldots, X_{m,i}, Y_i), i=1, 2, \ldots, n\}$. This MLR equation is then used as the output of an SQL query.

We will now provide the details of the above three embodiments.

First Embodiment for Obfuscating Data

In the first embodiment, the method uses $x_{TRUE,i}$ to denote the true value of a column (variable) in a database corresponding to the i-th record, i=1, 2, ... N, where N is the total number of records in the database. The method of weighted regression for data obfuscation can of course be applied to all of the N records. In the method for base data obfuscating in this embodiment, however, a representative subset of $x_{TRUE,i}$ values are selected and then a random error with variance proportional to the magnitude of $x_{TRUE,i}$ value is added to each of the values in the selected subset to obtain n pairs of data points $(x_i, y_i)$ where $x_i = x_{TRUE,i}$ and $y_i = x_i + e_i$, i=1, 2, . . . n. The random errors $e_i$ can be generated by first generating $e_i$ from a normal population with mean 0 and common standard deviation $\sigma$, and then multiplying $e_i$ by $\sqrt{x_i}$. Since the errors thus generated have variance proportional to $x_i$, the weighted least squares regression method is used; this involves minimizing the function $$H(a, b) = \sum_{i=1}^{n} w_i [y_i - (a + bx_i)]^2,$$

where $w_i = \frac{1}{cx_i}$, with $c = \left( \sum_{i=1}^{n} \frac{1}{x_i} \right)^{-1}$.

By setting the derivatives of H(a,b) with respect to a and b equal to 0, and solving the resulting system of the two linear equations in two unknowns a and b, we obtain the estimates of a and b:

$$\hat{b} = \frac{\sum_{i=1}^{n} w_i x_i y_i - \left( \sum_{i=1}^{n} w_i x_i \right)\left( \sum_{i=1}^{n} w_i y_i \right)}{\sum_{i=1}^{n} w_i x_i^2 - \left( \sum_{i=1}^{n} w_i x_i \right)^2} \quad (1)$$

$$\hat{a} = \sum_{i=1}^{n} w_i y_i - \hat{b} \sum_{i=1}^{n} w_i x_i. \quad (2)$$

where $\hat{a}$=estimate of a, and $\hat{b}$=estimate of b.

The subset $\{x_1, x_2, \ldots x_n\}$ can be selected in many ways. We will use the following simple method to select a subset of size n=20 for data obfuscating:

For each column $x_{TRUE}$ in the database, determine its 20-point summary as described below:

$$x_1 = \min_{1 \le i \le N} x_{TRUE,i}$$

$x_p = 5p-th$ percentile of the data $\{x_{TRUE,i}, i = 1, 2, \ldots N\}$, $p = 1, 2, \ldots, 18$ $$x_{20} = \max_{1 \le i \le N} x_{TRUE,i}$$

The method in this embodiment of data obfuscating can now be implemented as follows:

1. Compute the 20-point summary of the data $(x_{TRUE,i}, y_i)$, i=1, 2, . . . N, and obtain $x_i$, i=1, 2, . . . 20.

2. Generate $e_i$ from the normal distribution with mean 0 and standard deviation $\sigma$.

3. Calculate $y_i = x_i + e_i \sqrt{x_i}$.

4. Calculate weights $$w_i = \frac{1}{cx_i} \text{ with } c = \left(\sum_{i=1}^{20} \frac{1}{x_i}\right)^{-1}.$$

5. Calculate the weighted least squares estimates $\hat{a}$ and $\hat{b}$ using the equations (1) and (2) given above.

6. If the output of a query includes $x_{TRUE,i}$ then its obscured version $x_{OBSCURED,i} = \hat{a} + \hat{b} x_{TRUE,i}$ is used place of $x_{TRUE,i}$.

Now, examples of the weighted regression based obfuscating of base data and obfuscating aggregate data using random rounding are described.

Example 1

Linear Regression Based Obfuscating of Value Data

The data for this example was generated from the mixture normal distribution $$f(x) = 0.5f_1(x) + 0.25f_2(x) + 0.1f_3(x) + 0.1f_4(x) + 0.05f_5(x)$$

where $f_1(x)$ is normal with mean 5 and sd 1
$f_2(x)$ is normal with mean 50 and sd 5
$f_3(x)$ is normal with mean 1000 and sd 10
$f_4(x)$ is normal with mean 10000 and sd 100
and $f_5(x)$ is normal with mean 100000 and sd 100.

Figure 4:
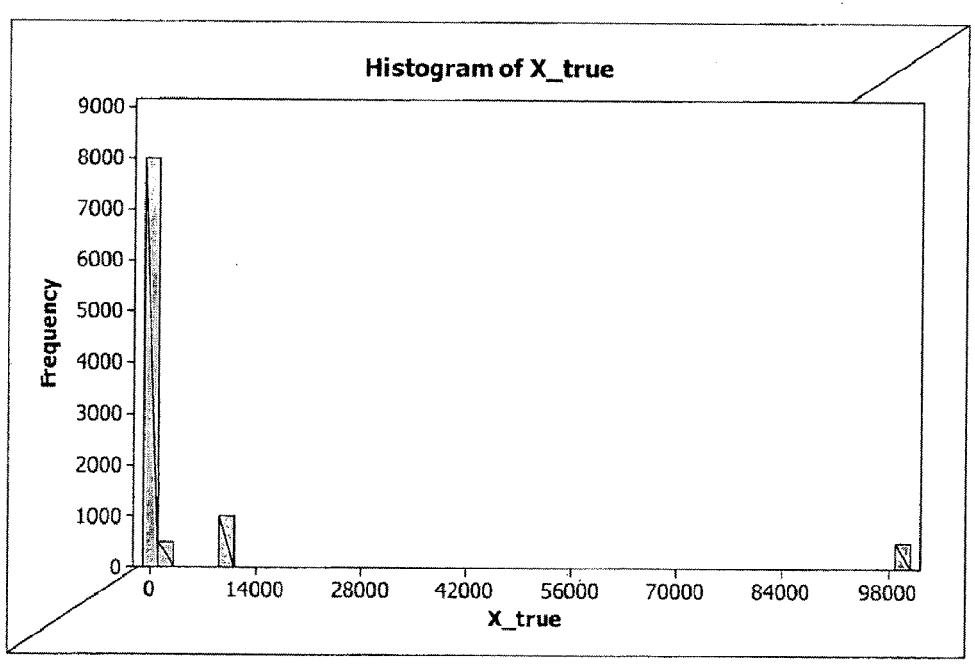
FIG. 4 shows a histogram of the synthetic data for the regression obfuscating of data in a first example.

A total of N=10000 data points were generated; this set of 10000 records is our database $\{x_{TRUE,i}, i=1, 2, \ldots, 10000\}$. A histogram of this synthetic data is shown in FIG. 4. The 20-point summary of this set was then calculated. The errors $e_i, i=1, 2, \ldots, 20$ were generated from the normal distribution with mean 0 and sd $\sigma=0.5$, and then $y_i$ is calculated as follows:

$$y_i = x_i + e_i, i = 1, 2, \ldots, 20$$

A straight line is then fitted to the $(x_i, y_i)$ data where $x_i = x_{TRUE,i}$, by using the method of weighted least squares, with weights inversely proportional to the variance of the error terms.

The intermediate calculations for this example are shown below.

The calculations for $\hat{a}$ and $\hat{b}$ for the above data are shown below:

$$\hat{b} = \frac{\sum_{i=1}^{n} w_i x_i y_i - \left(\sum_{i=1}^{n} w_i x_i\right)\left(\sum_{i=1}^{n} w_i y_i\right)}{\sum_{i=1}^{n} w_i x_i^2 - \left(\sum_{i=1}^{n} w_i x_i\right)^2} =$$

$$\frac{23.262 - 2.985032 * 2.737711}{22.37678 - 2.985032 * 2.985032} = 1.1205$$

$$\hat{a} = \sum_{i=1}^{n} w_i y_i - \hat{b} \sum_{i=1}^{n} w_i x_i = 2.737711 - 1.1205 * 2.985032 = -0.6071$$

We now illustrate the regression based data obfuscating on the results obtained from a query. Suppose a query on our synthetic database produced the 15 records, shown in the first column of Table 1. The second column shows the values of $X_{obscured} = -0.6071 + 1.1205 \times X_{TRUE}$ computed from the weighted regression line calculated above. The last column shows the values of diff=$X_{TRUE} - X_{obscured}$, which is the amount of obfuscating in the base data.

TABLE 2

The true and obscured values for the sample query

| X_true | X_obscured | diff |
|---|---|---|
| 6.673162 | 6.870178021 | −0.19702 |
| 55.20078 | 61.24537399 | −6.04459 |
| 4.921611 | 4.907565126 | 0.014046 |
| 100135.7 | 112201.4448 | −12065.7 |
| 3.346527 | 3.142683504 | 0.203843 |
| 45.62813 | 50.51921967 | −4.89109 |
| 4.382109 | 4.303053135 | 0.079056 |
| 10084.94 | 11299.56817 | −1214.63 |
| 5.707111 | 5.787717876 | −0.08061 |
| 3.530369 | 3.348678465 | 0.181691 |
| 990.7026 | 1109.475163 | −118.773 |
| 9920.742 | 11115.58431 | −1194.84 |

TABLE 1

Synthetic database of 10,000 records, its 20-point summary and data for regression

| Record | X true | | x | e | y | W |
|---|---|---|---|---|---|---|
| 1 | 9969.4260 | 20-point summary, | 1.4008 | 0.6875 | 2.3638 | 0.570184 |
| 2 | 44.1667 | data for regression | 3.7639 | −0.7694 | 0.868 | 0.078975 |
| 3 | 10176.3900 | and the weights | 4.1828 | −0.7197 | 1.1723 | 0.063949 |
| 4 | 5.4517 | ⟶ | 4.51 | −0.681 | 1.4388 | 0.055007 |
| 5 | 6.3310 | | 4.7924 | −0.0909 | 4.3567 | 0.048715 |
| 6 | 778.0419 | | 5.043 | 0.1865 | 5.9838 | 0.043994 |
| | — | | 5.2937 | 0.1088 | 5.8697 | 0.039925 |
| | — | | 5.554 | −0.6906 | 1.7184 | 0.036271 |
| | — | | 5.8887 | −0.944 | 0.33 | 0.032265 |
| | — | | 6.3422 | −0.0172 | 6.2328 | 0.027816 |
| | — | | 37.2412 | −0.0898 | 33.8954 | 0.000807 |
| | — | | 45.8824 | 1.3668 | 108.5957 | 0.000531 |
| | — | | 48.7086 | 0.6754 | 81.6084 | 0.000472 |
| | — | | 51.0818 | 0.7713 | 90.4796 | 0.000429 |
| 9995 | 4.8120 | | 54.0595 | 0.6915 | 91.4424 | 0.000383 |
| 9996 | 51.0423 | | 63.5219 | −0.3258 | 42.8245 | 0.000277 |
| 9997 | 5.5020 | | 1000.758 | 0.456 | 1457.117 | 1.12E−06 |
| 9998 | 100098.3000 | | 9755.701 | 0.0317 | 10064.75 | 1.18E−08 |
| 9999 | 100164.6000 | | 10004.5 | −0.2379 | 7624.596 | 1.12E−08 |
| 10000 | 4.1408 | | 100300 | 0.382 | 138614.9 | 1.11E−10 |

TABLE 2-continued

The true and obscured values for the sample query

| | X_true | X_obscured | diff |
|---|---|---|---|
| | 100024 | 112076.2849 | −12052.3 |
| | 1070.893 | 1199.328507 | −128.436 |
| SUM | 222356.4 | 249141.8103 | −26785.4 |

The percent relative difference is calculated from the formula $$100 \times \sum \left| \frac{(X_{true} - X_{obscured})}{X_{true}} \right| = 12.04\%$$

Figure 5:
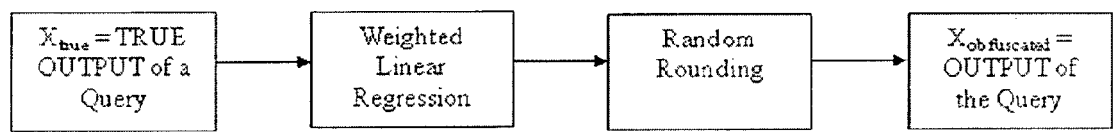
FIG. 5 shows a method for obfuscating data according to a third embodiment.
Figure 6:
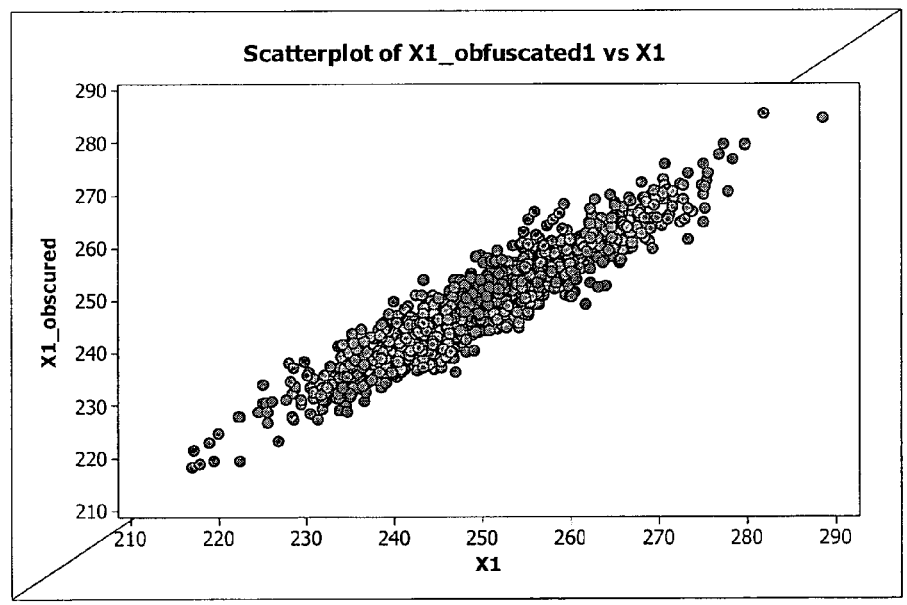
FIGS. 6-11 show plots of the obfuscated values (fitted values computed from the linear model) compared to the true $x_i$ values for i=1, 2, . . . , 6.
Figure 7:
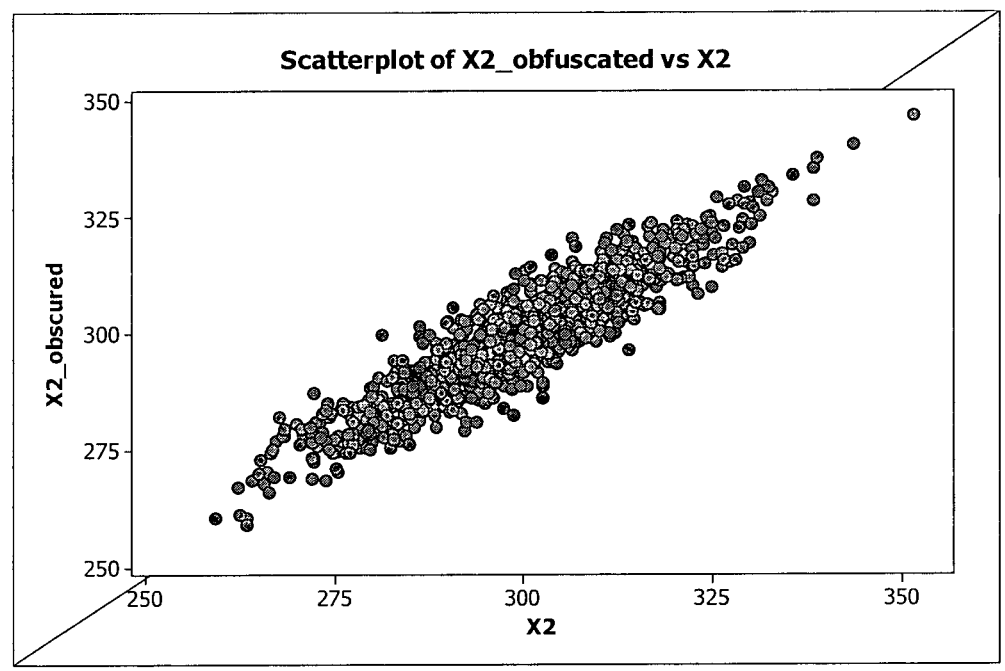
Figure 8:
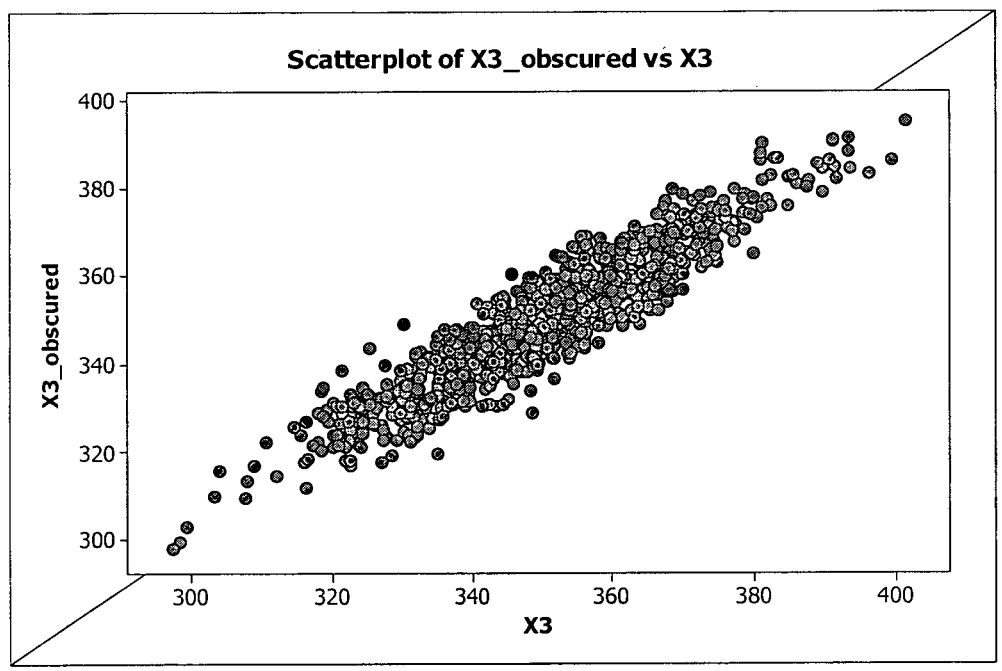
Figure 9:
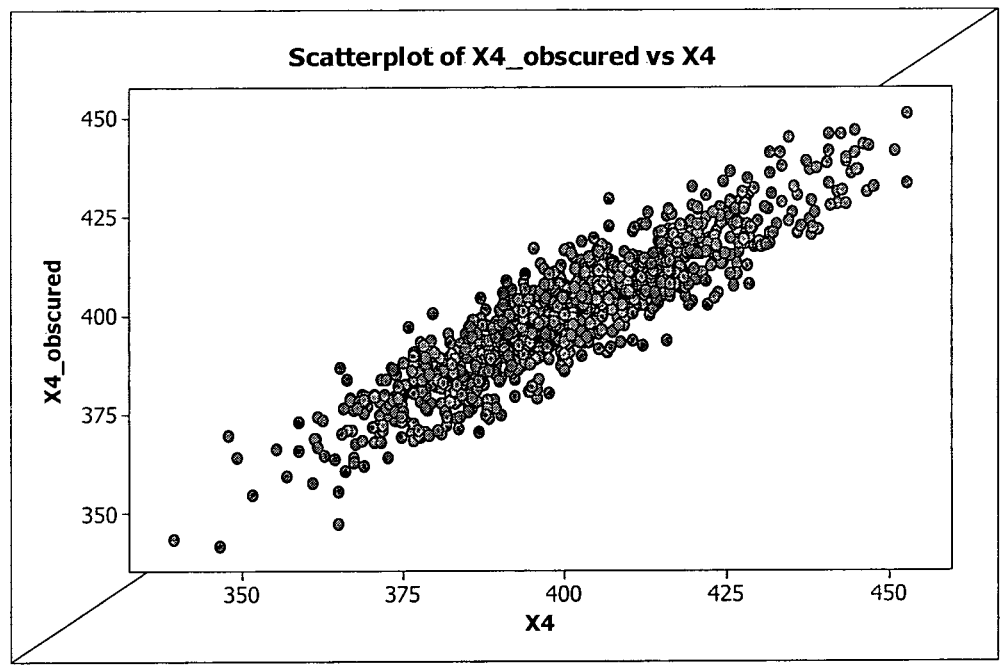
Figure 10:
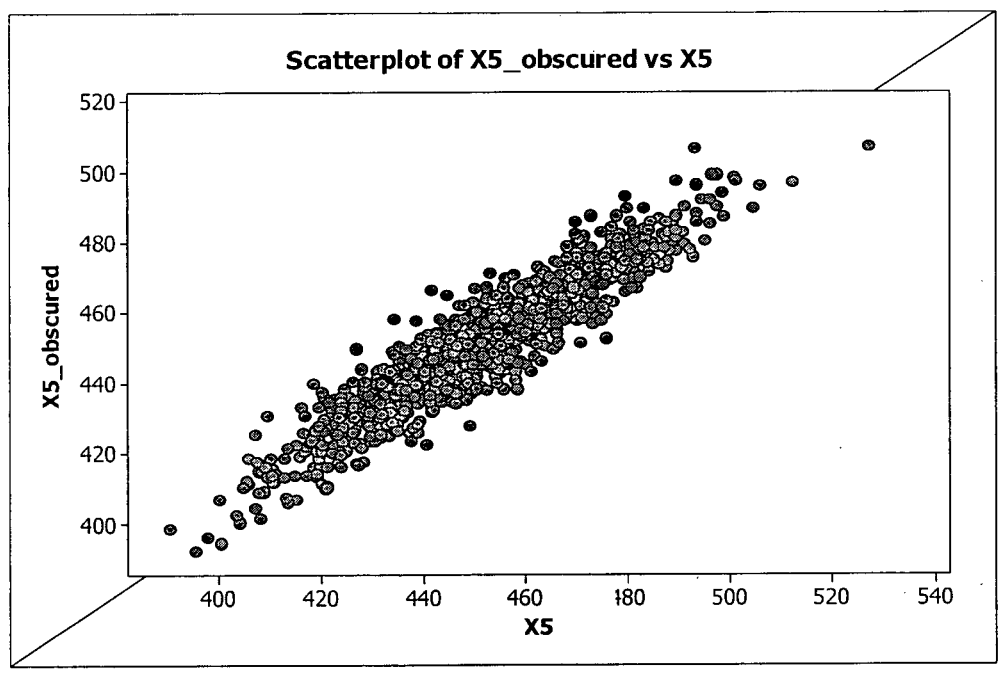
Figure 11:
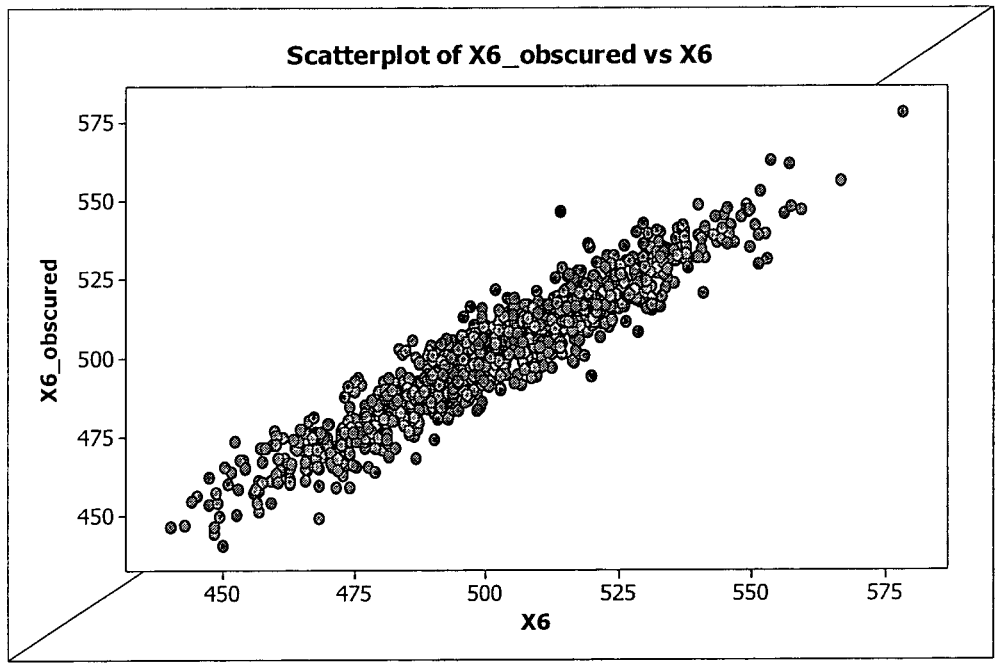

As mentioned earlier, the method may apply random rounding on output from weighted regression to further reduce the resolution, as shown in FIG. 5.

Example 2

Obfuscating the Aggregate

In obfuscating the aggregate, frequency suppression will be used and frequency values below a preset threshold will be suppressed. To illustrate this procedure, an example of random rounding with frequency suppression at 90 is used. In this example, if the frequency of a query is less than 90, then the frequency will be suppressed and the output will be annulled. Also, the random rounding procedure used in this example has base of 10, and rounds up a frequency if the last digit of the frequency is even, and rounds down if it is odd.

| Zip Code | Frequency | Random Rounded Frequency |
|---|---|---|
| 89012 | 93 | 90 |
| 89013 | 92 | 100 |
| 89014 | 90 | 100 |
| 89015 | 89 | E |

Frequency suppression, however, may not provide sufficient protection against tracker attacks (Duncan and Mukherjee, 2000), since the answer to a query with size less than the specified threshold (90 in the above example) may be computed from a finite sequence of legitimate queries, i.e., queries of sizes above 90 each. A high frequency filter can be configured to hamper such attempts to determine the true values from the obfuscated values.

In the following table, we illustrate the method of random rounding as applied to values; here we use notation rrX for random rounded X, and base equals 5×mean.

| Zip Code | Frequency | rrFrequency | Value | Mean | Base | rrValue |
|---|---|---|---|---|---|---|
| 89012 | 109 | 100 | 402.1212121 | 4.021212121 | 20 | 400 |
| 89013 | 91 | 90 | 299.53 | 3.32811 | 20 | 280 |

Second Embodiment for Obfuscating Data

In this embodiment, the method and system to obscure data uses a univariate statistical method for obfuscating data in one column of the database, without randomly perturbing the data.

(1) Calculate $X_i = g(X_{TRUE,i})$, where $g(X)$ is some non-linear function of X.
(2) Set the dependent variable as $Y_i = X_{TRUE,i}$ and the predictor as $X_i = g(X_{TRUE,i})$ and the straight line $Y_i = a + bX_i + e_i$ to the $(X_i, Y_i)$ data.
This fitted line is used as the output of an SQL query.

Example 2

Obfuscating of One Column without Adding a Random Error

Suppose a query produces 110 records. The obfuscating approach of the second embodiment can be used on a smaller subset of the data (e.g., a 5-point summary of the data), as demonstrated in Table 2 below. We have used $g(x) = x^{0.25}$ in this example.

TABLE 2

Intermediate calculations for data of Example 2

| Record | X | $X^{0.25}$ | | | X | g(X) |
|---|---|---|---|---|---|---|
| 1 | 1253.26 | 5.94991 | 5-point | minimum | 641.1 | 5.03189 |
| 2 | 747.49 | 5.22879 | summary | Q1 | 890.5 | 5.46271 |
| 3 | 1040.26 | 5.67917 | of data | median | 1009 | 5.63602 |
| 4 | 884.1 | 5.45288 | ---------→ | Q3 | 1098.3 | 5.75679 |
| 5 | 721.83 | 5.18333 | | maximum | 1369.6 | 6.08343 |
| . | . | . | | | | |
| . | . | . | | | | |
| . | . | . | | | | |
| 106 | 939.64 | 5.53656 | | | | |
| 107 | 856.18 | 5.4093 | | | | |
| 108 | 964.8 | 5.57325 | | | | |
| 109 | 925.26 | 5.51525 | | | | |
| 110 | 1075.46 | 5.72663 | | | | |

The regression equation fitted to the 5 data points (g(X), X) is X = −2846 + 688 g(X) with $g(X) = X^{0.25}$ The obscured values for x are calculated from the above regression line:

$$x_{obscured,i} = -2846 + 688 x^{0.25}$$

The descriptive statistics of the residual $x_i - x_{obscured,i}$ are given below:

| Variable | Mean | sd | Minimum | Q1 | Median | Q3 | Maximum |
|---|---|---|---|---|---|---|---|
| resid | −13.82 | 12.59 | −23.63 | −22.55 | −18.45 | −10.87 | 30.20 |

Third Embodiment for Obfuscating Data

In this embodiment, the method and system to obscure data uses a multivariate statistical method of PCR for obfuscating data in one or more columns without randomly perturbing the data.

Obfuscating of Several Columns at Once

The method of this invention can be carried out in steps (a) and (b).

Step (a): Perform Principal Components Analysis (PCA) of data in records produced by a query in the following 8 steps:
 1) If several columns need to be obscured at once, then the data in these columns (say p columns) of the database are first read by the computer code.
 2) The correlation matrix R of the multivariate data is computed.

3) An eigenanalysis of R is performed, which yields p eigenvalue-eigenvector pairs $(\lambda_i, l_i)$, $\lambda_1 \geq \lambda_2 \geq \ldots \geq \lambda_p \geq 0$ where $\lambda_i$ is the i-th eigenvalue and $l_i$ is the corresponding eigenvector and p is the number of columns to be obscured.
4) An integer m<p is selected (smaller the value of m, larger the amount of obfuscating).
5) Principal components (PC's) $PC_1, PC_2, \ldots, PC_m$ are calculated from the formula $$PC_i = l_i^T X = l_{1i} X_1 + l_{2i} X_2 + \ldots + l_{pi} X_p.$$

6) The PC-scores are the values of the principal components calculated for each record. The PC-scores are computed and saved in the computer code.

The first m PC's explain $$100 \times \frac{\lambda_1 + \lambda_2 + \ldots + \lambda_m}{\lambda_1 + \lambda_2 + \ldots + \lambda_p}$$

percent of variation in the data set. A multiple regression equation is obtained for each of columns. $X_i$. Taken together, the p principal components explain 100% of variation in the data.

8) Save the principal components scores (values of the PC's for the records produced by the query) which will be denoted by $PC_{1,i}, PC_{2,i}, \ldots, PC_{p,i}$ Step (b): Run PCR for each column $X_i$ as a function of the first m PC-scores $PC_{1,i}, PC_{2,i}, \ldots, PC_{m,i}$:

Use the method of least squares to fit the linear model $$X_{j,i} = \beta_{j,0} + \beta_{j,1} PC_{1,i} + \ldots + \beta_{j,m} PC_{m,i} + e_i$$

where $X_{j,i}$=true value of the j-th column for the i-th record j=1, 2, . . . , p; i=1, 2, . . . , n p=the number of columns to be obscured n=the number of records produced by the query m=the number of PCs selected for obscuring Appendix A shows an example of obfuscating multivariate data using the PCR-based approach of this invention.

Obfuscating of One Column Only by the Method of PCR

The method also provides a PCR-based solution even for the case when only one column of the database needs obfuscating. As explained above, the PCR requires a minimum of 2 columns so the invention includes a way to work around this problem. This method is briefly described below:

1) Suppose a query produces n records with values $X_i$, where X is the column in the database that needs obfuscating. Create p−1 additional columns $g_j(X_i)$ where $g_j(X)$ is a non-linear function of X where $X_i$=value of the column X for the i-th record j=1, 2, . . . , p−1; i=1, 2, . . . , n p−1=the number of additional columns created n=the number of records produced by the query 2) Perform PCA, save PC—scores, and then use Principal Components Regression (PCR) to obtain an equation for X as a function of the first m PC's.

The PCR based obfuscating of this invention will output aggregates that are computed from random-rounded versions of values predicted by the above MLR equation.

Example 3

PCR Based Obfuscating of Several Columns

We created a small database with N=1000 records and p=6 variables from a multivariate normal distribution. The sample correlation matrix of the data generated is given in Table 1.

TABLE 1

Sample correlation matrix of the generated data

| | X1 | X2 | X3 | X4 | X5 |
|---|---|---|---|---|---|
| X2 | 0.607 | 0.383 | 0.205 | 0.077 | −0.024 |
| X3 | 0.383 | 0.734 | 0.556 | 0.427 | 0.313 |
| X4 | 0.205 | 0.556 | 0.807 | 0.641 | 0.498 |
| X5 | 0.077 | 0.427 | 0.641 | 0.833 | 0.695 |
| X6 | −0.024 | 0.313 | 0.498 | 0.695 | 0.876 |

The results of PCA are shown in Table 2 (eigenvalues and proportion of variance explained) and Table 3 (PC loadings).

TABLE 2

Eigenvalues of the sample correlation matrix and proportion of total variance in data explained by the PC's.

| Eigenvalue | 3.6905 | 1.4183 | 0.4178 | 0.2563 | 0.1321 | 0.0851 |
|---|---|---|---|---|---|---|
| Proportion | 0.615 | 0.236 | 0.07 | 0.043 | 0.022 | 0.014 |
| Cumulative | 0.615 | 0.851 | 0.921 | 0.964 | 0.986 | 1 |

TABLE 3

PC loadings

| Variable | PC1 | PC2 | PC3 | PC4 | PC5 | PC6 |
|---|---|---|---|---|---|---|
| X1 | 0.199 | 0.688 | −0.599 | 0.351 | −0.07 | 0.015 |
| X2 | 0.389 | 0.446 | 0.181 | −0.73 | 0.29 | 0.03 |
| X3 | 0.461 | 0.155 | 0.522 | 0.202 | −0.655 | −0.145 |
| X4 | 0.478 | −0.13 | 0.23 | 0.463 | 0.532 | 0.453 |
| X5 | 0.456 | −0.328 | −0.246 | 0.04 | 0.226 | −0.756 |
| X6 | 0.401 | −0.424 | −0.471 | −0.297 | −0.385 | 0.449 |

The linear models for to $X_i$ (i=1, 2, . . . , 6) using the PC-scores as the predictors, along with their respective $R^2$ values, are given in Tables 4-9.

TABLE 4

The regression model for $X_1$

| Predictor | Coef | SE Coef | T | P |
|---|---|---|---|---|
| Constant | 250.012 | 0.119 | 2093.61 | 0.000 |
| PC1 | −14.1732 | 0.5927 | −23.91 | 0.000 |
| PC2 | 17.7975 | 0.6549 | 27.18 | 0.000 |
| PC3 | 9.0245 | 0.1161 | 77.73 | 0.000 |

Regression equation: $X_1$ = 250 − 14.2 PC1 + 17.8 PC2 + 9.02 PC3 ($R^2$ = 88.4%)

TABLE 5

The regression model for $X_2$

| Predictor | Coef | SE Coef | T | P |
|---|---|---|---|---|
| Constant | 299.818 | 0.178 | 1681.44 | 0.000 |
| PC1 | −3.4900 | 0.8850 | −3.94 | 0.000 |
| PC2 | 9.3266 | 0.9779 | 9.54 | 0.000 |
| PC3 | 6.6379 | 0.1734 | 38.29 | 0.000 |

Regression equation: X2 = 300 − 3.49 PC1 + 9.33 PC2 + 6.64 PC3 ($R^2$ = 84.1%)

TABLE 6

The regression model for $X_3$ (PC2 and PC3 terms were not significant)

| Predictor | Coef | SE Coef | T | P |
|---|---|---|---|---|
| Constant | 350.354 | 0.187 | 1876.70 | 0.000 |
| PC1 | 7.04275 | 0.08787 | 80.15 | 0.000 |

Regression equation: X3 = 350 + 7.04 PC1 ($R^2$ = 86.6%)

TABLE 7

The regression model for $X_4$ (PC2 and PC3 terms were not significant)

| Predictor | Coef | SE Coef | T | P |
|---|---|---|---|---|
| Constant | 400.649 | 0.241 | 1664.96 | 0.000 |
| PC1 | 7.8820 | 0.1133 | 69.59 | 0.000 |

Regression equation: X4 = 401 + 7.88 PC1 ($R^2$ = 82.9%)

TABLE 8

The regression model for $X_5$ (PC3 term was not significant)

| Predictor | Coef | SE Coef | T | P |
|---|---|---|---|---|
| Constant | 450.938 | 0.231 | 1950.19 | 0.000 |
| PC1 | −28.2182 | 0.9917 | −28.46 | 0.000 |
| PC2 | 40.308 | 1.097 | 36.73 | 0.000 |

Regression equation: X5 = 451 − 28.2 PC1 + 40.3 PC2 ($R^2$ = 87.1%)

TABLE 9

The regression model for $X_6$

| Predictor | Coef | SE Coef | T | P |
|---|---|---|---|---|
| Constant | 500.681 | 0.231 | 2164.36 | 0.000 |
| PC1 | −24.631 | 1.148 | −21.45 | 0.000 |
| PC2 | 36.169 | 1.269 | 28.51 | 0.000 |
| PC3 | −7.1788 | 0.2249 | −31.92 | 0.000 |

Regression equation: X6 = 501 − 24.6 PC1 + 36.2 PC2 − 7.18 PC3 ($R^2$ = 89.6%)

FIGS. 6-11 show plots of the obscured values (fitted values computed from the above linear model) vs, the true $x_i$ values for i=1, 2, . . . , 6.

To assess the performance of the proposed data obfuscating method, we calculated descriptive statistics for the N values of error=$x_{i,j} - \hat{x}_{i,j}$ and also relative error=$100 \times |(x_{i,j} - \hat{x}_{i,j})/x_{i,j}|$ Table 10 shows the descriptive statistics of performance measures. The variables Q1 and Q3 in Table 10 are the first and third quartiles of the error and relative error terms.

TABLE 10

Summary statistics of error and relative error in the six variables $X_1, X_2, \ldots, X_6$

| Variable | Mean | Variance | Minimum | Q1 | Median | Q3 | Maximum |
|---|---|---|---|---|---|---|---|
| Error in X1 | 0 | 14.218 | −11.331 | −2.585 | −0.064 | 2.401 | 12.07 |
| Rel_error in X1 | 1.2036 | 0.8322 | 0.0004 | 0.4972 | 0.9874 | 1.7484 | 4.6153 |
| Error in X2 | 0 | 31.699 | −19.049 | −3.781 | 0.146 | 3.815 | 17.344 |
| Rel_error in X2 | 1.4981 | 1.3135 | 0.0007 | 0.5786 | 1.2629 | 2.1233 | 6.7796 |
| Error in X3 | 0 | 34.817 | −19.294 | −4.202 | −0.228 | 4.048 | 19.572 |
| Rel_error in X3 | 1.3613 | 1.0146 | 0.0003 | 0.5627 | 1.1838 | 1.9387 | 5.8484 |
| Error in X4 | 0 | 57.848 | −22.5 | −5.138 | 0.121 | 5.284 | 21.998 |
| Rel_error in X4 | 1.5289 | 1.2876 | 0.0017 | 0.6099 | 1.3057 | 2.2694 | 6.2762 |
| Error in X5 | 0 | 53.359 | −24.871 | −4.925 | 0.12 | 4.772 | 23.027 |
| Rel_error in X5 | 1.2896 | 0.974 | 0.0001 | 0.5124 | 1.0686 | 1.8954 | 5.6318 |
| Error in X6 | 0 | 53.353 | −32.515 | −4.824 | 0.004 | 4.79 | 25.43 |
| Rel_error in X6 | 1.1544 | 0.8086 | 0.0004 | 0.4446 | 0.972 | 1.6568 | 6.3231 |

Table 11 shows the descriptive statistics of the 'true' data in the simulated database, and Table 12 shows the descriptive statistics of the 'obscured' data. The variables Q1 and Q3 in Table 11 are the first and third quartiles of the error and relative error terms.

TABLE 11

Summary statistics of the generated data

| Variable | Count | Mean | Variance | Minimum | Q1 | Median | Q3 | Maximum |
|---|---|---|---|---|---|---|---|---|
| X1 | 1000 | 250.01 | 122.89 | 216.87 | 242.87 | 249.68 | 257.07 | 288.31 |
| X2 | 1000 | 299.82 | 199.53 | 259.03 | 290.79 | 299.99 | 309.57 | 351.35 |
| X3 | 1000 | 350.35 | 258.95 | 297.3 | 339.54 | 351.07 | 361.09 | 401.4 |
| X4 | 1000 | 400.65 | 338.58 | 339.32 | 387.57 | 400.37 | 413.32 | 452.79 |
| X5 | 1000 | 450.94 | 413.92 | 390.41 | 437.01 | 451.01 | 464.4 | 526.81 |
| X6 | 1000 | 500.68 | 513.03 | 440.36 | 484.96 | 500.55 | 516.78 | 578.5 |

TABLE 12

Summary statistics of the obscured data

| Variable | Count | Mean | Variance | Minimum | Q1 | Median | Q3 | Maximum |
|---|---|---|---|---|---|---|---|---|
| X1_hat | 1000 | 250.01 | 108.67 | 218.29 | 242.94 | 250.05 | 257.17 | 285.7 |
| X2_hat | 1000 | 299.82 | 167.83 | 259.14 | 291.3 | 300.27 | 308.91 | 346.92 |
| X3_hat | 1000 | 350.35 | 224.14 | 297.89 | 340.28 | 351.22 | 359.86 | 395.3 |
| X4_hat | 1000 | 400.65 | 280.74 | 341.94 | 389.38 | 401.62 | 411.28 | 450.96 |
| X5_hat | 1000 | 450.94 | 360.56 | 392.39 | 437.87 | 451.25 | 464.21 | 507.22 |
| X6_hat | 1000 | 500.68 | 459.67 | 440.64 | 486.13 | 501.6 | 515.53 | 578.02 |

Discussion of Results for Third Embodiment

Table 2 shows that for the generated database, first 3 PC's account for 92.1% of the total variation in the data. We therefore used PC1, PC2, and PC3 as the potential predictors for MLR models for the 6 variables in the database. Table 13 shows the number of PC's used in the selected MLR models and the corresponding $R^2$ values. It should be kept in mind that the amount of obfuscating in the variables is controlled by the number of PC's used in the regression models; smaller the number of PC's used, larger will be the error and the relative error terms.

TABLE 13

Number of PC's used in the model and the corresponding $R^2$ values

| Variable | Number of PC's used in the selected MLR model | $R^2$ |
|---|---|---|
| $X_1$ | 3 | 88.4% |
| $X_2$ | 3 | 84.1% |
| $X_3$ | 1 | 86.5% |
| $X_4$ | 1 | 86.6% |
| $X_5$ | 2 | 87.1% |
| $X_6$ | 3 | 89.6% |

It can be seen from Table 10 that the mean relative error is around 1% and the maximum relative error ranges from approximately 4% to 20%. Tables 11 and 12 show the close agreement between the true and obscured values.

Detailed Description of the Fourth Embodiment

The regression based obfuscating method of embodiments 1 and 2 requires a representative subset of values in the column of database to be obfuscated so that the amount of obfuscating can be controlled. In this embodiment, the regression will be performed on a frequency table representation or histogram of the data. The values in one column of a secret database typically come not from one homogeneous statistical population but a mixture of several statistical populations, which range from very small to very large values. When a histogram based on equal class width is created for such values, it is quite difficult to get a good resolution without using an extremely large number of class-intervals, which is not practical (see FIGS. 12, 13, and 15). In this embodiment, a frequency table based upon unequal class widths is first calculated, and the regression is performed on the perturbed versions of the mid-points of these class intervals. The details of this embodiment are given below:

1) The range of the data values is divided into k class-intervals $(L_1, U_1), (L_2, U_2), \ldots, (L_k, U_k)$ where $L_1$=minimum value, $U_k$≥maximum value, and the width $U_j-L_j$ of the j-th class-interval is proportional to the middle point $M_j=(L_j+U_j)/2$.

2) The number of values in the database column falling inside the j-th class-interval is calculated. Let $f_j$ denote this frequency.

3) Random errors $e_j$ (j=1, 2, . . . , k) are generated from a normal distribution with mean 0 and variance $M_j$ to make the error proportional to the magnitude of the middle point of the class-interval.

4) The mid-points are perturbed by adding error $e_j$, j=1, 2, . . . , k. This yields the values of the dependent variable $Y_j$, j=1, 2, . . . , k.

5) A straight line Y=a+b M is fitted to the k pairs of points $(M_j, Y_j)$ obtained in Step 4 above. The method of weighted least squares is used to fit this straight line to the k pairs of points.

6) The weight $W_j$ assigned to the j-th point $(M_j, Y_j)$ is taken to be directly proportional to the frequency $f_j$ since a class-interval with high frequency should be assigned a higher weight than a class-interval with low frequency.

7) The weight $W_j$ assigned to the j-th point $(M_j, Y_j)$ is taken to be inversely proportional to the mid-point $M_j$ since large values will need a large amount of perturbation.

8) The requirements in steps 6 and 7 above lead to the following weights:

$$W_j = c \frac{f_j}{M_j}$$

where $$c = \frac{1}{\sum_{j=1}^{k} \frac{f_j}{M_j}}.$$

9) The constants a and b of the straight line of step 5 above are estimated from the following equations (see Cardno and Singh, 2008):

$$\hat{b} = \frac{\sum_{j=1}^{k} W_j M_j Y_j - \left(\sum_{i=1}^{k} W_j X_j\right)\left(\sum_{i=1}^{k} W_j Y_j\right)}{\sum_{j=1}^{k} W_j X_j^2 - \left(\sum_{j=1}^{k} W_j X_j\right)^2} \quad (1)$$

$$\hat{a} = \left(\sum_{i=1}^{k} W_j Y_j\right) - \hat{b} \sum_{j=1}^{k} W_j X_j \quad (2)$$

where the weights $W_j$ are given in step 8 above, and â=estimate of a, and b̂=estimate of b.

10) If the result of a query includes the i-th record in the database with true value $X_{TRUE,i}$ then the query outputs aggregate calculated from the following equation:

$$X_{obfuscated,i} = \hat{a} + \hat{b} X_{TRUE,i}.$$

We next describe two examples of frequency table based obfuscating of values in one column of a database.

Example 4

Weighted Least Squares Obfuscation Based on Frequency Table of Data Generated from a Mixture Normal Distribution

The data for this example was generated from the mixture normal distribution $$f(x) = 0.5 f_1(x) + 0.25 f_2(x) + 0.1 f_3(x) + 0.1 f_4(x) + 0.05 f_5(x)$$

where
$f_1(x)$ is normal with mean 5 and sd 1
$f_2(x)$ is normal with mean 50 and sd 5
$f_3(x)$ is normal with mean 1000 and sd 10
$f_4(x)$ is normal with mean 10000 and sd 100
and $f_5(x)$ is normal with mean 100000 and sd 100.

A total of N=10000 data points were generated; this set of 10000 records constitutes our database $\{x_{TRUE,i}, i=1, 2, \ldots, 10000\}$.

Figure 12:
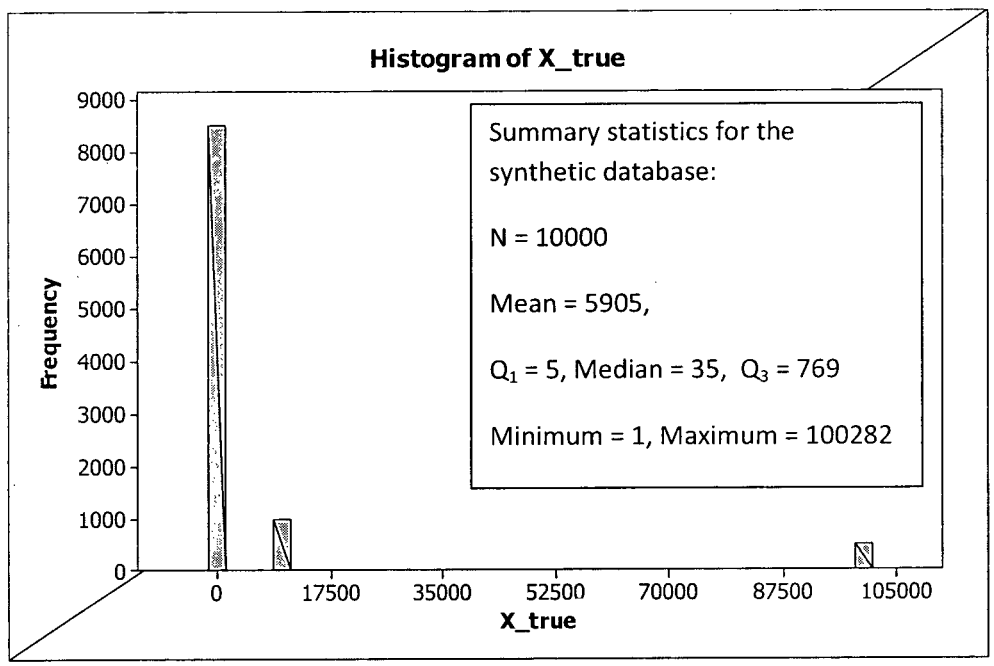
FIG. 12 shows a histogram of values in a synthetic database based upon 49 equal intervals.
Figure 13:
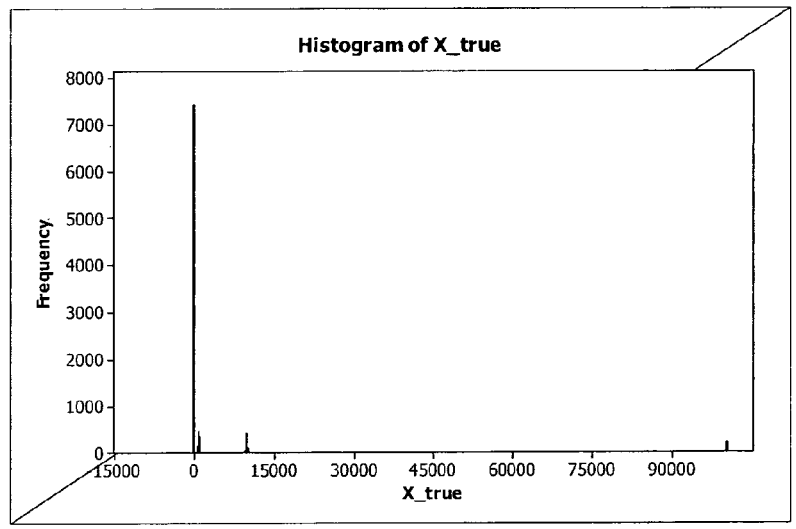
FIG. 13 shows a histogram of values in a synthetic database based upon 1000 equal intervals. It can be seen from FIG. 2 that even when a large number of equal class intervals is used, the frequency table has very poor resolution (especially for small values) and is not suitable for data obscuring.
Figure 14:
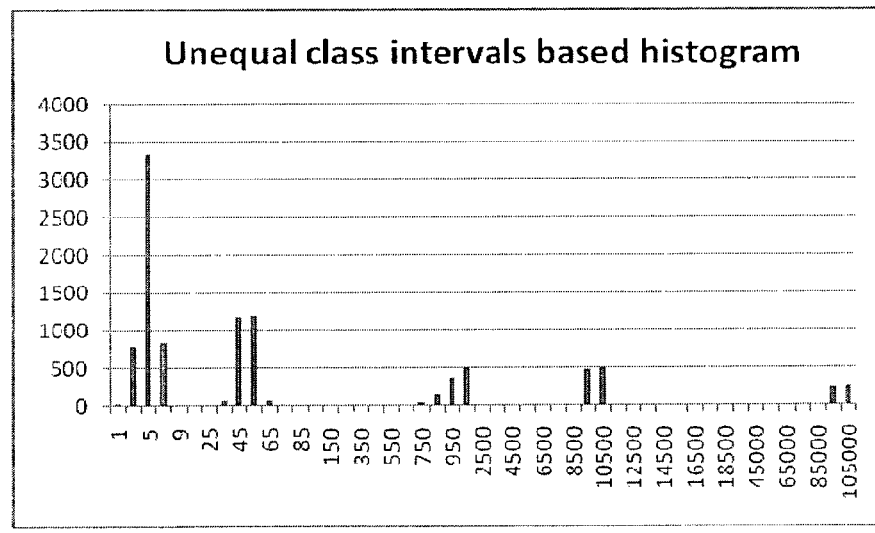
FIG. 14 shows a histogram of values in a synthetic database based upon unequal intervals; the x-axis in this figure is not to scale.
Figure 15:
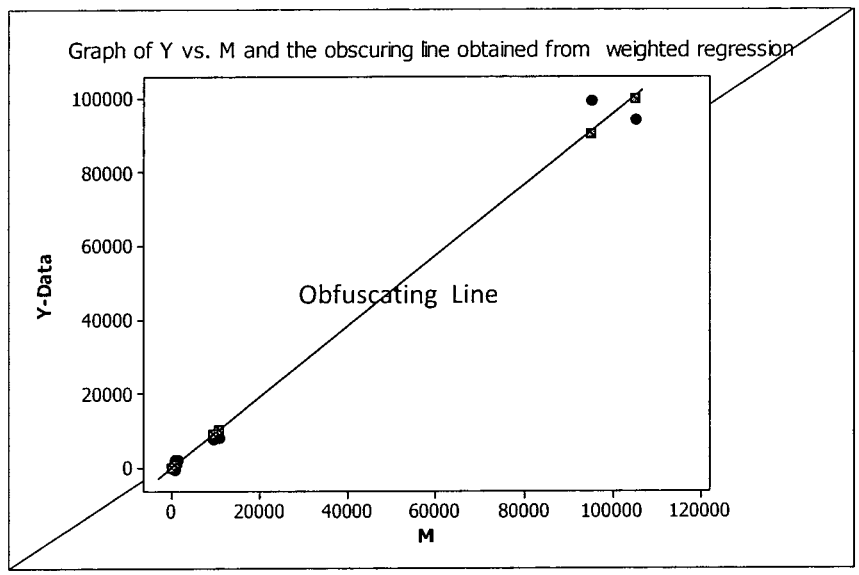
FIG. 15 shows a graph of perturbed mid-points (Y) vs. true mid-points (M) of class intervals to which the weighted least squares line is fit.

A histogram based upon equal class-intervals with k=49 is shown in FIG. 12. It can be seen that the resolution is very poor for obfuscating. A histogram based upon equal class-intervals with k=1000 (FIG. 13) does not improve the resolution by much. The method of this invention therefore is based upon a frequency tabulation of the data based upon unequal class intervals (FIG. 14). FIG. 15 shows a graph of perturbed mid-points (Y) vs. true mid-points (M) of class intervals, for Example 4.

Table 14 shows the intermediate calculations for computing the estimates of the intercept a and the slope b of the obfuscating straight line. The obscured values corresponding to each value in the database was the computed from the fitted regression line.

Table 15 shows the descriptive statistics of the amount of obfuscation over the entire synthetic database of 10000 records for varying σ values.

Table 16 shows the error $$\sum_{j=1}^{50} (X_{TRUE,j} - X_{obscured,j})$$

and the percent relative error $$100 \times \sum_{j=1}^{50} |(X_{TRUE,j} - X_{obscured,j})/X_{TRUE,j}|$$

in the aggregate of a random query of size 50 for varying σ values.

Example 5

Weighted Least Squares Obfuscating Based on Frequency Table of Data Generated from the Zipf Distribution

The Zipf probability distribution, sometimes referred to as the "zeta distribution" is given by $$f(x; \alpha) = \frac{1}{\varsigma(\alpha) x^\alpha}, \quad x = 1, 2, 3, \ldots \quad ; \quad \alpha > 1$$

is a constant
where
$\varsigma(\alpha)$=Riemann zeta-function defined as $$\varsigma(\alpha) = \sum_{x=1}^{\infty} \frac{1}{x^\alpha}$$

The Zipf distribution can be used to model the probability distribution of rank data in which the probability of the n-th ranked item is given by $$\frac{1}{\varsigma(\alpha) n^\alpha}.$$

Gan et al. (2006) discuss modeling the probability distribution of city-size by the Zipf distribution.

Hörmann and Derflinger (1996) developed a rejection-inversion method for generating random numbers from monotone discrete probability distributions. For this example, we used the acceptance-rejection method of Devroye (1986) to generate a synthetic database of 10000 records. This method is briefly described below:

1) Generate $u_1$ and $u_2$ from the uniform distribution on the interval (0, 1).

2) Set $x = u_1^{-1/(\alpha-1)}, \quad t = \left(1 + \frac{1}{x}\right)^{\alpha-1}$ 3) Accept $x$ if $x \leq \frac{t}{t-1} \frac{2^{\alpha-1}-1}{2^{\alpha-1} u_2}.$ The random variable x has the Zipf distribution with parameter α.

Figure 16:
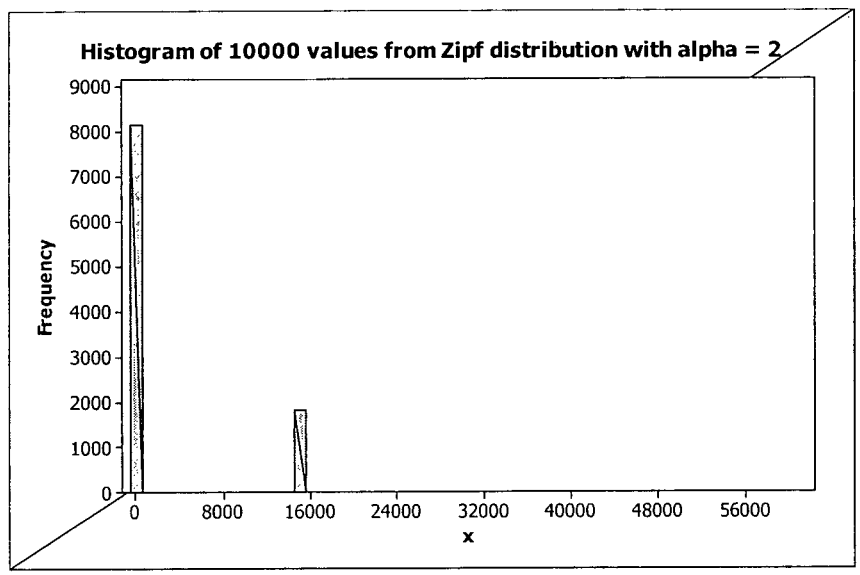
FIG. 16 shows a histogram of values in the synthetic database with 62 equal class intervals.
Figure 17:
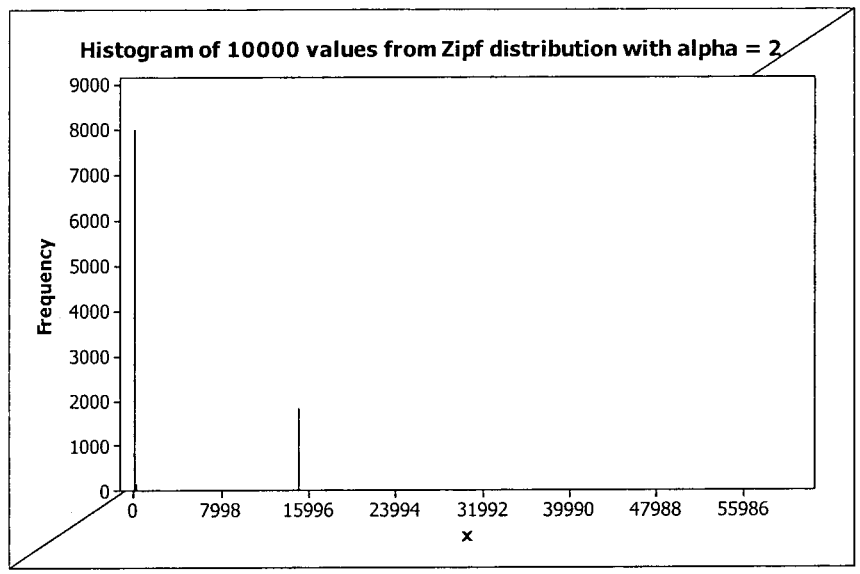
FIG. 17 shows a histogram of values in the synthetic database with 1000 equal class intervals.
Figure 18:
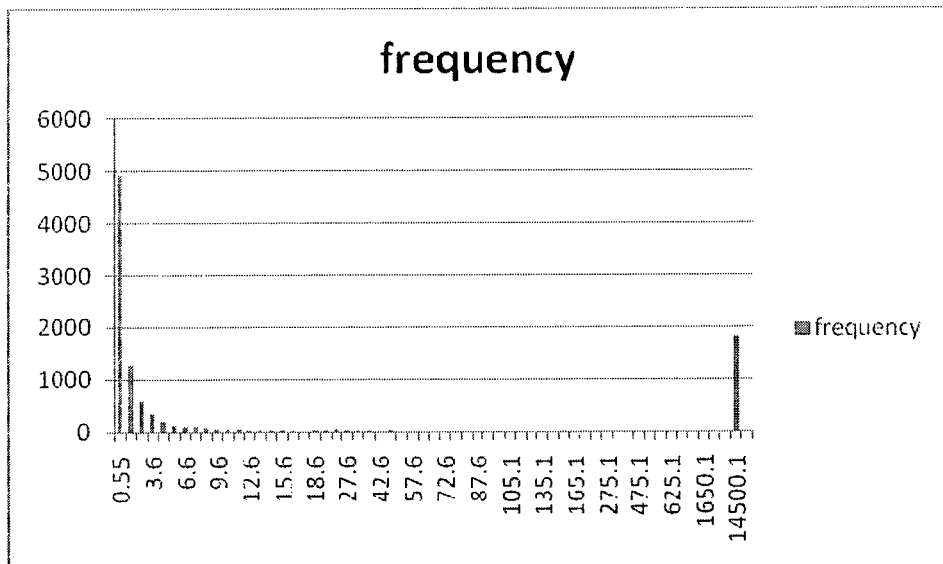
FIG. 18 shows a histogram of values in the synthetic database with 67 unequal class intervals.

For Example 5, a synthetic database of 10000 integer values were generated using the method 5 for generating random numbers from the Zipf distribution with α=2. FIGS. 16 and 17 show histograms of these values for k=62 and k=1000 class intervals of equal width. FIG. 18 shows a histogram with k=67 intervals of increasing widths.

Table 15 shows the intermediate calculations for computing the estimates of the intercept a and the slope b of the obfuscating straight line for data of Example 5. The obscured values corresponding to each value in the database was the computed from the fitted regression line.

Table 16 shows the descriptive statistics of the amount of obfuscating over the entire synthetic database of 10000 records for σ=20, 40, 60, 80, 100.

Table 17 shows the error $$\sum_{j=1}^{50} (X_{TRUE,j} - X_{obscured,j})$$

and the percent relative error $$100 \times \sum_{j=1}^{50} |(X_{TRUE,j} - X_{obscured,j})/X_{TRUE,j}|$$

in the aggregate of a random query of size 50 for varying σ values.

TABLE 14

Calculations for fitting the obscuring straight line by the weighted least squares method for data of Example 4

| L | U | m | f | wx | wy | wxx | wxy |
|---|---|---|---|----|----|-----|-----|
| 0 | 2 | 1 | 9 | 0.008069 | −0.26023 | 0.008069 | −0.26023 |
| 2 | 4 | 3 | 790 | 0.708321 | −9.37363 | 2.124962 | −28.1209 |
| 4 | 6 | 5 | 3363 | 3.015294 | 6.762929 | 15.07647 | 33.81464 |
| 6 | 8 | 7 | 825 | 0.739702 | −2.04455 | 5.177913 | −14.3119 |
| 8 | 10 | 9 | 8 | 0.007173 | 0.013931 | 0.064556 | 0.125379 |
| 10 | 20 | 15 | 0 | 0 | 0 | 0 | 0 |
| 20 | 30 | 25 | 0 | 0 | 0 | 0 | 0 |
| 30 | 40 | 35 | 63 | 0.056486 | −0.2904 | 1.977021 | −10.164 |
| 40 | 50 | 45 | 1180 | 1.057998 | 4.279576 | 47.6099 | 192.5809 |
| 50 | 60 | 55 | 1189 | 1.066067 | −1.67135 | 58.6337 | −91.9241 |
| 60 | 70 | 65 | 62 | 0.05559 | −0.07716 | 3.613332 | −5.01514 |
| 70 | 80 | 75 | 0 | 0 | 0 | 0 | 0 |
| 80 | 90 | 85 | 0 | 0 | 0 | 0 | 0 |
| 90 | 100 | 95 | 0 | 0 | 0 | 0 | 0 |
| 100 | 200 | 150 | 0 | 0 | 0 | 0 | 0 |
| 200 | 300 | 250 | 0 | 0 | 0 | 0 | 0 |
| 300 | 400 | 350 | 0 | 0 | 0 | 0 | 0 |
| 400 | 500 | 450 | 0 | 0 | 0 | 0 | 0 |
| 500 | 600 | 550 | 0 | 0 | 0 | 0 | 0 |
| 600 | 700 | 650 | 1 | 0.000897 | −0.00059 | 0.582795 | −0.38348 |
| 700 | 800 | 750 | 26 | 0.023312 | 0.020081 | 17.48386 | 15.0611 |
| 800 | 900 | 850 | 140 | 0.125525 | 0.355698 | 106.6964 | 302.3435 |
| 900 | 1000 | 950 | 376 | 0.337125 | 0.478472 | 320.2685 | 454.5482 |
| 1000 | 2000 | 1500 | 512 | 0.459064 | 0.73695 | 688.5952 | 1105.425 |
| 2000 | 3000 | 2500 | 0 | 0 | 0 | 0 | 0 |
| 3000 | 4000 | 3500 | 0 | 0 | 0 | 0 | 0 |
| 4000 | 5000 | 4500 | 0 | 0 | 0 | 0 | 0 |
| 5000 | 6000 | 5500 | 0 | 0 | 0 | 0 | 0 |
| 6000 | 7000 | 6500 | 0 | 0 | 0 | 0 | 0 |
| 7000 | 8000 | 7500 | 0 | 0 | 0 | 0 | 0 |
| 8000 | 9000 | 8500 | 0 | 0 | 0 | 0 | 0 |
| 9000 | 10000 | 9500 | 482 | 0.432165 | 0.3616 | 4105.57 | 3435.2 |
| 10000 | 11000 | 10500 | 493 | 0.442028 | 0.337409 | 4641.293 | 3542.796 |
| 11000 | 12000 | 11500 | 0 | 0 | 0 | 0 | 0 |
| 12000 | 13000 | 12500 | 0 | 0 | 0 | 0 | 0 |
| 13000 | 14000 | 13500 | 0 | 0 | 0 | 0 | 0 |
| 14000 | 15000 | 14500 | 0 | 0 | 0 | 0 | 0 |
| 15000 | 16000 | 15500 | 0 | 0 | 0 | 0 | 0 |
| 16000 | 17000 | 16500 | 0 | 0 | 0 | 0 | 0 |
| 17000 | 18000 | 17500 | 0 | 0 | 0 | 0 | 0 |
| 18000 | 19000 | 18500 | 0 | 0 | 0 | 0 | 0 |
| 19000 | 20000 | 19500 | 0 | 0 | 0 | 0 | 0 |
| 40000 | 50000 | 45000 | 0 | 0 | 0 | 0 | 0 |
| 50000 | 60000 | 55000 | 0 | 0 | 0 | 0 | 0 |
| 60000 | 70000 | 65000 | 0 | 0 | 0 | 0 | 0 |
| 70000 | 80000 | 75000 | 0 | 0 | 0 | 0 | 0 |
| 80000 | 90000 | 85000 | 0 | 0 | 0 | 0 | 0 |
| 90000 | 100000 | 95000 | 234 | 0.209806 | 0.219203 | 19931.6 | 20824.24 |
| 100000 | 110000 | 105000 | 247 | 0.221462 | 0.198511 | 23253.54 | 20843.68 |
|  |  | TOTAL | 10000 | 8.966084 | 0.046453 | 53199.92 | 50599.63 |

Class interval = (L, U),

M = middle point of the class interval, f = frequency of the class interval $w_j$ = weight assigned to the middle point of the j-th class interval $wx = w_j \times m_j$, $wy = w_j \times y_j$, $wxx = w_j \times m_j \times m_j$, $wxy = w_j \times m_j \times y_j$, Calculations for the Obscuring Line for Example 4

Obscuring straight line is $$\hat{y} = x_{obscured} = \hat{a} + \hat{b} x_{TRUE}$$

where $$\hat{b} = \frac{\sum_{i=1}^{n} w_i x_i y_i - \left(\sum_{i=1}^{n} w_i x_i\right)\left(\sum_{i=1}^{n} w_i y_i\right)}{\sum_{i=1}^{n} w_i x_i^2 - \left(\sum_{i=1}^{n} w_i x_i\right)^2} = \frac{wxy - wx \times wy}{wxx - (wx)^2}$$

$$= \frac{53199.92 - 8.966084 \times 0.046453}{50599.63 - 8.966084^2} = 0.952554$$

$$\hat{a} = wy - \hat{b} \times wx = 0.046453 - 0.952554 \times 8.966084 = -8.49423$$

TABLE 15

Descriptive statistics of $X_{TRUE,j} - X_{obscured,j}$ ($j = 1, 2, ..., 10000$) for the synthetic database for $\sigma = 20, 40, ..., 120$, for data of Example 4.

| | σ | | | | | |
|---|---|---|---|---|---|---|
| | 20 | 40 | 60 | 80 | 100 | 120 |
| Minimum | 8.52 | −9161.44 | −301.01 | −1939.74 | −45682 | −13.57 |
| Q1 | 8.73 | −76.48 | 67.4 | 37.57 | −222.7 | −12.85 |
| Median | 10.15 | −5.15 | 67.6 | 53.75 | 135.8 | −7.34 |
| Mean | 288.67 | −559.06 | 45.37 | −69.41 | −2576.3 | 978.91 |
| Q3 | 44.89 | −4.9 | 67.6 | 53.81 | 136.9 | −3.32 |
| Maximum | 4766.47 | −4.6 | 67.62 | 53.88 | 138.6 | 16515.7 |

TABLE 16

Sum of results (true and obscured) and the percent relative error in the sum of a random query of size 50, for data of Example 4

| | σ | | | | | |
|---|---|---|---|---|---|---|
| | 20 | 40 | 60 | 80 | 100 | 120 |
| Sum_query | 263472.6 | 436649 | 173540.3 | 206721.5 | 401662.9 | 215029.4 |
| Sum_obs | 250547.2 | 476738.9 | 170796.8 | 208137.1 | 578206.2 | 180273.9 |
| % Rel Error | 4.91 | 9.18 | 1.58 | 0.68 | 43.95 | 16.16 |

TABLE 17

Calculations for fitting the obscuring straight line by weighted least squares method for data of Example 4

| M | y | w | wx | wy | wxx | wxy |
|---|---|---|---|---|---|---|
| 0.6 | 5.3 | 0.879457 | 0.483701 | 4.62269 | 0.27 | 2.54 |
| 1.6 | −4.9 | 0.077483 | 0.123973 | −0.37819 | 0.2 | −0.61 |
| 2.6 | 20.8 | 0.021818 | 0.056727 | 0.45458 | 0.15 | 1.18 |
| 3.6 | 11.6 | 0.00893 | 0.032148 | 0.10384 | 0.12 | 0.37 |
| 4.6 | −91.1 | 0.004125 | 0.018974 | −0.37584 | 0.09 | −1.73 |
| 5.6 | 6.3 | 0.002107 | 0.011798 | 0.01334 | 0.07 | 0.07 |
| 6.6 | 46.5 | 0.001445 | 0.009536 | 0.06718 | 0.06 | 0.44 |
| 7.6 | −48.5 | 0.00119 | 0.009045 | −0.05767 | 0.07 | −0.44 |
| 8.6 | 13.2 | 0.000777 | 0.006685 | 0.01023 | 0.06 | 0.09 |
| 9.6 | −24.2 | 0.000389 | 0.003736 | −0.00942 | 0.04 | −0.09 |
| 10.6 | 76.6 | 0.000436 | 0.004621 | 0.03338 | 0.05 | 0.35 |
| 11.6 | 58.7 | 0.000322 | 0.003736 | 0.0189 | 0.04 | 0.22 |
| 12.6 | 27.7 | 0.000187 | 0.00236 | 0.00519 | 0.03 | 0.07 |
| 13.6 | 35.7 | 0.000202 | 0.002753 | 0.00723 | 0.04 | 0.1 |
| 14.6 | −40.5 | 0.000175 | 0.002556 | −0.0071 | 0.04 | −0.1 |
| 15.6 | −52.7 | 0.000088 | 0.001376 | −0.00465 | 0.02 | −0.07 |
| 16.6 | 17.7 | 0.000083 | 0.001376 | 0.00147 | 0.02 | 0.02 |
| 17.6 | −94 | 0.000067 | 0.00118 | −0.0063 | 0.02 | −0.11 |
| 18.6 | −26.2 | 0.000069 | 0.001278 | −0.0018 | 0.02 | −0.03 |
| 19.6 | −14.4 | 0.00008 | 0.001573 | −0.00116 | 0.03 | −0.02 |
| 22.6 | −76 | 0.000183 | 0.004129 | −0.01389 | 0.09 | −0.31 |
| 27.6 | 18 | 0.000103 | 0.002851 | 0.00186 | 0.08 | 0.05 |
| 32.6 | −35.5 | 0.000066 | 0.002163 | −0.00235 | 0.07 | −0.08 |
| 37.6 | −50.5 | 0.000039 | 0.001475 | −0.00198 | 0.06 | −0.07 |
| 42.6 | 118.1 | 0.000014 | 0.00059 | 0.00163 | 0.03 | 0.07 |
| 47.6 | −236.5 | 0.000033 | 0.001573 | −0.00782 | 0.07 | −0.37 |
| 52.6 | 177.8 | 0.000009 | 0.000492 | 0.00166 | 0.03 | 0.09 |
| 57.6 | −157.4 | 0.00002 | 0.00118 | −0.00322 | 0.07 | −0.19 |
| 62.6 | 27.3 | 0.000017 | 0.001081 | 0.00047 | 0.07 | 0.03 |
| 67.6 | 267.4 | 0.000007 | 0.000492 | 0.00194 | 0.03 | 0.13 |
| 72.6 | 111.7 | 0.000003 | 0.000197 | 0.0003 | 0.01 | 0.02 |
| 77.6 | 55.4 | 0.000008 | 0.00059 | 0.00042 | 0.05 | 0.03 |
| 82.6 | 212.8 | 0.000007 | 0.00059 | 0.00152 | 0.05 | 0.13 |
| 87.6 | 248.3 | 0.000008 | 0.000688 | 0.00195 | 0.06 | 0.17 |
| 92.6 | 83.6 | 0.000003 | 0.000295 | 0.00027 | 0.03 | 0.02 |
| 97.6 | 139 | 0.000003 | 0.000295 | 0.00042 | 0.03 | 0.04 |
| 105.1 | 49.9 | 0.000007 | 0.000688 | 0.00033 | 0.07 | 0.03 |
| 115.1 | 224.1 | 0.000005 | 0.00059 | 0.00115 | 0.07 | 0.13 |
| 125.1 | 106.4 | 0.000007 | 0.000885 | 0.00075 | 0.11 | 0.09 |
| 135.1 | −321.4 | 0.000001 | 0.000197 | −0.00047 | 0.03 | −0.06 |
| 145.1 | 139.8 | 0.000003 | 0.000393 | 0.00038 | 0.06 | 0.05 |
| 155.1 | −82.5 | 0.000001 | 0.000197 | −0.0001 | 0.03 | −0.02 |
| 165.1 | 141 | 0.000002 | 0.000295 | 0.00025 | 0.05 | 0.04 |
| 185.1 | 83.4 | 0.000001 | 0.000197 | 0.00009 | 0.04 | 0.02 |
| 225.1 | 187.3 | 0.000001 | 0.000295 | 0.00025 | 0.07 | 0.06 |
| 275.1 | 13.4 | 0.000001 | 0.000295 | 0.00001 | 0.08 | 0 |
| 325.1 | 387.7 | 0 | 0.000098 | 0.00012 | 0.03 | 0.04 |
| 375.1 | 888.1 | 0.000001 | 0.000393 | 0.00093 | 0.15 | 0.35 |
| 475.1 | 541.3 | 0 | 0.000098 | 0.00011 | 0.05 | 0.05 |
| 525.1 | −177.7 | 0 | 0.000098 | −0.00003 | 0.05 | −0.02 |
| 575.1 | 775.2 | 0 | 0.000197 | 0.00027 | 0.11 | 0.15 |
| 625.1 | 1324.7 | 0 | 0.000098 | 0.00021 | 0.06 | 0.13 |
| 975.1 | −280.3 | 0 | 0.000098 | −0.00003 | 0.1 | −0.03 |
| 1450.1 | 988.1 | 0 | 0.000098 | 0.00007 | 0.14 | 0.1 |
| 1650.1 | 1413.3 | 0 | 0.000098 | 0.00008 | 0.16 | 0.14 |
| 3150.1 | 1162.7 | 0 | 0.000098 | 0.00004 | 0.31 | 0.11 |
| 4750.1 | 4381.9 | 0 | 0.000098 | 0.00009 | 0.47 | 0.43 |
| 14500.1 | 12592.6 | 0.000012 | 0.179717 | 0.15607 | 2605.91 | 2263.1 |
| 61000.1 | 57164.6 | 0 | 0.000098 | 0.00009 | 6 | 5.62 |
| TOTAL | | 1.000000 | 0.983132 | 4.63974 | 2616.42 | 2272.52 |

Calculations for the Obscuring Line for Example 5

Obscuring straight line is $$\hat{y} = x_{obscured} = \hat{a} + \hat{b} x_{TRUE}$$

where $$\hat{b} = \frac{\sum_{i=1}^{n} w_i x_i y_i - \left(\sum_{i=1}^{n} w_i x_i\right)\left(\sum_{i=1}^{n} w_i y_i\right)}{\sum_{i=1}^{n} w_i x_i^2 - \left(\sum_{i=1}^{n} w_i x_i\right)^2} = \frac{wxy - wx \times wy}{wxx - (wx)^2} = 0.8671647$$

$$\hat{a} = wy - \hat{b} \times wx = 3.787212$$

TABLE 18

Descriptive statistics of $X_{TRUE,j} - X_{obscured,j}$ (j = 1, 2, ..., 10000) for the synthetic database of Example 5 for σ = 20, 40, ..., 100.

| | σ | | | | |
|---|---|---|---|---|---|
| | 20 | 40 | 60 | 80 | 100 |
| Minimum | −3.654 | −23232.40 | −3202.24 | −472.3 | 26.41 |
| Q1 | −3.654 | −21.62 | 47.64 | −103.0 | 26.41 |
| Median | −3.522 | −19.35 | 47.95 | −102.9 | 26.58 |
| Mean | 361.909 | −1062.94 | −98.16 | −119.5 | 514.07 |
| Q3 | −2.725 | −18.97 | 48.01 | −102.9 | 27.65 |
| Maximum | 8124.938 | −18.97 | 48.01 | −102.9 | 10869.92 |

TABLE 19

Sum of results (true and obscured) and the percent relative error in the sum of a random query of size 50 for the synthetic database of Example 2 for σ = 20, 40, ..., 100.

| | σ | | | | |
|---|---|---|---|---|---|
| | 20 | 40 | 60 | 80 | 100 |
| Sum_query | 180095 | 120132 | 90341 | 105133 | 180073 |
| Sum_obs | 156361.4 | 166633.2 | 92736.4 | 110913.7 | 146852.3 |
| % Rel Error | 16.47298 | 48.38554 | 3.314384 | 6.873101 | 23.06059 |

It will thus be seen that the present invention provides a method and system for obfuscating data that is repeatable, computationally efficient, provides a query language interface, can return identical results for identical records and preserves the confidentiality of the secret data. An independent obfuscation engine isolates obfuscation from the query engine and facilitates operation in a distributed computing environment. Dedicated obfuscation hardware reduces the risk of obfuscation being avoided.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

REFERENCES

Cox, Lawrence H. (1980). Suppression methodology and statistical disclosure control. Journal of the American Statistical Association, pp. 377-385.

Cox, Lawrence H. (1987). A constructive procedure for unbiased controlled rounding. Journal of the American Statistical Association, pp. 520-524.

Duncan, George T. and Lambert, Dianne (1986). Disclosure-limited data dissemination. Journal of the American Statistical Association, pp. 10-18.

Duncan, George T. and Mukherjee, Sumitra (2000). Optimal Disclosure-limited strategy in statistical databases: deterring tracker attacks through additive noise. Journal of the American Statistical Association, pp. 720-729.

Franconi, Louisa and Stander, Julian (2002). A model-based method for disclosure limitation of business microdata. The Statistician. pp. 51-61.

Gonzalez Jr, Joe Fred, and Cox, Lawrence H. (2005). Software for tabular data protection. Statistics in Medicine. Vol. 24:659-669

Johnson, R. A. and Wichern, D. W. (2007). Applied Multivariate Statistical Analysis, 6$^{th}$ Edition. Prentice Hall, Jew Jersey.

Kelly, James P., Golden, Bruce L., Assad Arjang A, and Baker, Edward K. (1990). Controlled Rounding of Tabular Data. Operations Research, Vol. 38, No. 5. (September-October, 1990), pp. 760-772.

Kutner, Michael H, Neter, John, Nachtsheim, Chris J., and Wasserman, William (2006). *Applied Linear Regression Models*. McGraw-Hill/Irwin. (http://doi.contentdirections.com/mr/mgh.jsp-?doi=10.1036/0072386916)

Nargundkar, M. S., and Saveland, W. (1972). Random rounding to prevent statistical disclosures. Proceedings of the Social Statistics Section, American Statistical Association, pp. 382-385.

Salazar-Gonz'alez, Juan-Jos'e and Schoch, Markus (2004). A New Tool for Applying Controlled Rounding to a Statistical Table in Microsoft Excel. Lecture Notes in Computer Science, Volume 3050, Springer-Verlag, 44-57.

The invention claimed is:

1. A method of obfuscating data in which output values of a data query are obfuscated in a repeatable manner, via the use of an Obfuscating Function (OF) while maintaining an amount of obfuscation within a range in which the obfuscated output values provide to a user information of a first level of granularity, the repeatable manner comprising generating a same value of obfuscated data for each data query having a same value of input data, wherein the OF uses a transformation based upon a method of weighted regression, including perturbing values to obtain a dependent variable for the weighted regression and based upon addition of random errors to the output values of the data query to form a dependent variable y for the weighted regression, and using a non-obfuscated data value as an independent variable.

2. The method of obfuscating data as claimed in claim 1 based upon minimizing a Total Weighted Error.

3. The method of obfuscating data as claimed in claim 2 in which the Total Weighted Error is defined to be a Sum of Squared Errors.

4. The method of obfuscating data of claim 1, in which frequency data having a first level of granularity is shown to the user at a second level of granularity, coarser than the first level of granularity, wherein the data is converted from the first level of granularity to the second level of granularity according to a rule other than a simple proximity of the data to a nearest value at the second level of granularity.

5. The method of obfuscating data, as claimed in claim 4, that is a mapping based method based on a last digit of the data.

6. The method of obfuscating data, as claimed in claim 4, using random rounding based upon an odd number being rounded up and an even number being rounded down.

7. The method of obfuscating data, as claimed in claim 4, using random rounding based upon an even number being rounded up and an odd number being rounded down.

8. The method of obfuscating data, as claimed in claim 4, using a pseudo random number seeding function which seeds a random number generator with input values, the output of the random number generator either rounded up or rounded down, or results shifted by a rounded amount up or down.

9. The method of obfuscating data, as claimed in claim 4, using a pseudo random number seeding function which seeds a random number generator with input values, the output of the random number generator either shifted up or down a number of granularity factors.

10. The method of obfuscating data as claimed in claim 1 in which a high frequency filter is configured to hamper attempts to determine non-obfuscated values from obfuscated values.

11. The method of obfuscating data as claimed in claim 1 in which the obfuscated values are anticipated and pre-calculated.

12. The method of obfuscating data as claimed in claim 1 wherein the data request consists of multiple logical components, each being applied separately.

13. The method of obfuscating data as claimed in claim 12 in which restrictions are applied to the data relating to the granularity of the frequency data.

14. The method of obfuscating data as claimed in claim 1 in which the amount of obfuscation is altered in response to an algorithm.

15. The method of obfuscating data as claimed in claim 14 where the alteration of the amount of obfuscation is made in response to different use access rights.

16. The method of obfuscating data as claimed in claim 15 where the alteration of the amount of obfuscation is made in response to different levels of frequency of output aggregation allowing the data to be of a quality to make business decisions.

17. The method of obfuscating data as claimed in claim 1 wherein the frequency of each output value is determined at a first level of granularity and converted to a second level of granularity, coarser than the first level of granularity, wherein the data is converted from the first level of granularity to the second level of granularity according to a rule using a pseudo random number seeding function.

18. A method of representing data having a first level of granularity and a second level of granularity, coarser than the first level of granularity, wherein the data is converted from the first level of granularity to the second level of granularity according to a rule using a pseudo random number seeding function which seeds a random number generator with input values, the output of the random number generator either rounded up or rounded down, or results shifted by a rounded amount up or down.

19. The method of representing data having a first level of granularity and a second level of granularity, coarser than the first level of granularity, as claimed in claim 18, wherein the output of the random number generator is either shifted up or down a number of granularity factors.

20. The method of representing data having a first level of granularity and a second level of granularity, coarser than the first level of granularity as claimed in claim 18 in which the values of the data at the second level of granularity are anticipated and pre-calculated.

21. The method of representing data having a first level of granularity and a second level of granularity, coarser than the first level of granularity as claimed in claim 18 in which the coarseness of the second level of granularity is altered in response to an algorithm.

22. The method of representing data having a first level of granularity and a second level of granularity, coarser than the first level of granularity as claimed in claim 21 where the coarseness of the second level of granularity is made in response to different use access rights.

23. The method of representing data having a first level of granularity and a second level of granularity, coarser than the first level of granularity as claimed in claim 22 where the coarseness of the second level of granularity is made in response to different levels of frequency of output aggregation allowing the data to be of a quality to make business decisions.

24. A computer implemented obfuscation system comprising:
at least one processor; and
memory storing data instructions that when executed by the at least one processor cause the at least one processor to:
run a query on data in a secret database to produce output data; and
obfuscate the output data using a repeatable obfuscation function to return obfuscated data in response to the query, wherein the repeatable obfuscation function uses a transformation used in mathematical modeling, based upon the method of weighted regression including perturbing values to obtain a dependent variable for the weighted regression and based upon addition of random errors to true values to form a dependent variable y for weighted regression, and using a non-obfuscated data value as an independent variable.

25. The system as claimed in claim 24 wherein the obfuscated values are anticipated and pre-calculated.

26. The system as claimed in claim 24 in which the amount of obfuscation is altered in response to an algorithm.

27. The system as claimed in claim 26 where the alteration of the amount of obfuscation is made in response to different use access rights.

28. The system as claimed in claim 27 where the alteration of the amount of obfuscation is made in response to different levels of frequency of output aggregation allowing the data to be of a quality to make business decisions.

* * * * *